US012052791B2

United States Patent
Zhang

(10) Patent No.: US 12,052,791 B2
(45) Date of Patent: Jul. 30, 2024

(54) METHOD AND DEVICE USED IN COMMUNICATION NODE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 399 days.

(21) Appl. No.: 17/517,677

(22) Filed: Nov. 3, 2021

(65) Prior Publication Data

US 2022/0141915 A1    May 5, 2022

(30) Foreign Application Priority Data

Nov. 4, 2020  (CN) .......................... 202011216816.X

(51) Int. Cl.
    *H04W 76/27*    (2018.01)
(52) U.S. Cl.
    CPC .................................. *H04W 76/27* (2018.02)
(58) Field of Classification Search
    CPC . H04W 76/27; H04W 36/0069; H04W 36/36; H04W 76/15; H04W 72/535; H04W 72/566; H04L 5/0005; H04L 5/0053
    See application file for complete search history.

(56) References Cited

U.S. PATENT DOCUMENTS

| 2020/0229054 A1 | 7/2020 | Lee |
| 2023/0292192 A1* | 9/2023 | Eklöf .................. H04W 36/385 |
| | | 370/331 |

(Continued)

FOREIGN PATENT DOCUMENTS

| CN | 105827369 A | 8/2016 |
| CN | 110545567 A | 12/2019 |

(Continued)

OTHER PUBLICATIONS

3GPP TSG-RAN WG2 #112e; Tdoc R2-2010003; Source: Ericsson; Title: Conditional PSCell Change / Addition; Electronic meeting, Nov. 2-13, 2020 (Year: 2020).*

(Continued)

*Primary Examiner* — Mohammed S Chowdhury

(57) ABSTRACT

A method and a device used in communication nodes for wireless communications. A communication node receives a first signaling, the first signaling comprising a first flag, processes a first storage space according to the first flag; herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration. The present disclosure supports simultaneous CPC configurations of an MN and an SN.

18 Claims, 6 Drawing Sheets

(56) References Cited

U.S. PATENT DOCUMENTS

2023/0300691 A1* 9/2023 Eklöf ................ H04W 36/0069
                                                          370/331
2023/0308961 A1* 9/2023 Awada .............. H04W 36/0069
                                                          370/331
2023/0354116 A1* 11/2023 Jung ..................... H04W 36/36

FOREIGN PATENT DOCUMENTS

CN          110832946 A      2/2020
CN          111314974 A      6/2020

OTHER PUBLICATIONS

3GPP TSG-RAN WG2 Meeting #111-e; R2-2007237; Source: Intel Corporation; Title: Rel-17 Conditional PSCell Addition; Electronic Meeting, Aug. 17-28, 2020. (Year: 2020).*
3GPP TSG-RAN WG2 Meeting #112-e; R2-2009475; Source: Apple; Title: Discussion on conditional PSCell change and addition; Electronic, Nov. 2-Nov. 13, 2020. (Year: 2020).*
3GPP TSG RAN WG2 #107; R2-1909320; Source: Ericsson; Title: Configuration of Conditional handover in LTE ; Prague, Czech Republic, Aug. 26-30, 2019. (Year: 2019).*
First Office Action of Chinese patent application No. CN202011216816.X dated Feb. 1, 2024.
First Search Report of Chinese patent application No. CN202011216816.X dated Jan. 30, 2024.
Samsung "Progressing conditional configuration for R17" 3GPP TSG-RAN WG2#112-e Meeting R2-2010088 Oct. 23, 2020.

* cited by examiner

FIRST STORAGE SPACE

```
-- ASN1START
-- TAG-FIRST STORAGE SPACE-START
FIRST STORAGE SPACE ::=   FIRST STRUCTURE TYPE {
      PARAMETER SET LIST        ANY PARAMETER SET
}
ANY PARAMETER SET ::=   SECOND STRUCTURE TYPE {
      FIRST FIELD
      SECOND FIELD
      THIRD FIELD
      FOURTH FIELD
}
-- TAG-FIRST STORAGE SPACE-STOP
-- ASN1STOP
```

METHOD AND DEVICE USED IN COMMUNICATION NODE FOR WIRELESS COMMUNICATION

CROSS REFERENCE TO RELATED APPLICATIONS

This application claims the priority benefit of Chinese Patent Application No. 202011216816.X, filed on Nov. 4, 2020, the full disclosure of which is incorporated herein by reference.

BACKGROUND

Technical Field

The present disclosure relates to transmission methods and devices in wireless communication systems, and in particular to a transmission method and device of multi-connection.

Related Art

During the formulation of 3rd Generation Partnership Project (3GPP) Release 16, mobility enhancement on New Radio (NR) and Long Term Evolution (LTE) has been completed to reduce interruption of data transmission during handover and improve handover robustness. Conditional PSCell Addition/Change (CPAC) was discussed in a Work Item (WI) of enhanced Dual Connection and Carrier Aggregation (eDCCA) and mobility enhancement, which was not completed due to time constraints. A WI of "further enhancement of Multi-Radio Dual-Connectivity (MR-DC)" of Release 17 was approved at RAN 86th plenary, which further researches the CPAC and supports some scenarios not involved in Release 16.

SUMMARY

Both a Master Node (MN) and a Secondary Node (SN) can initiate Conditional PSCell Changes (CPCs), where execution conditions can be determined by the MN or the SN. Due to time constraints, 3GPP Release 16 is only designed for CPCs initiated by the SN not involving the MN, and when the SN and the MN configure the CPCs at the same time, there is no solution to coordinate the CPCs configured by the MN and the SN.

To address the above problem, the present disclosure provides a solution. In the statement above, the scenario of Terrestrial Network (TN) is taken as an example; the present disclosure is also applicable to scenarios such as Non-Terrestrial Network (NTN) and V2X, where similar technical effects can be achieved. Additionally, the adoption of a unified solution for various scenarios contributes to the reduction of hardware complexity and costs.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

It should be noted that if no conflict is incurred, embodiments in any node in the present disclosure and the characteristics of the embodiments are also applicable to any other nodes, and vice versa. And the embodiments in the present disclosure and the characteristics in the embodiments can be arbitrarily combined if there is no conflict.

The present disclosure provides a method in a first node for wireless communications, comprising:
  receiving a first signaling, the first signaling comprising a first flag, processing a first storage space according to the first flag;
  herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target configuration, and the third field comprises a target condition.

In one embodiment, the first signaling comprises all or part of an RRCReconfiguration message.

In one embodiment, the first signaling comprises all or part of an RRCConnectionReconfiguration message.

In one embodiment, the first signaling comprises a Radio Resource Control (RRC) message.

In one embodiment, the first signaling comprises all or partial IEs in an RRC message.

In one embodiment, processing the first storage space comprises: adding one or more parameter sets.

In one embodiment, processing the first storage space comprises: changing one or more parameter sets.

In one embodiment, processing the first storage space comprises: deleting one or more parameter sets.

In one embodiment, processing the first storage space comprises: replacing one or more parameter sets.

In one embodiment, processing the first storage space comprises: deleting all parameter sets in the first storage space.

In one embodiment, processing the first storage space comprises: clearing the first storage space.

In one embodiment, the first flag comprises N1 bit(s), N1 being a positive integer.

In one embodiment, the first flag comprises a bitmap, the bitmap comprises N2 bit(s), N2 being a positive integer.

In one embodiment, the first flag is a Boolean Variable.

In one embodiment, a problem to be solved in the present disclosure includes: how a UE processes when it receives a same CPC configuration originating from the first entity and the second entity.

In one embodiment, advantages of the above method include supporting simultaneous CPC configurations of an MN and an SN.

In one embodiment, advantages of the above method include that a UE can only maintain one storage space instead of a plurality of storage spaces, which can avoid coordination of the plurality of storage spaces, thus simplifying the processing of the UE.

According to one aspect of the present disclosure, comprising:
  when the first flag is set, updating a first target parameter set to a first parameter set; and when the first flag is not set, reserving the first target parameter set;

herein, the first target parameter set is a parameter set in the first storage space; a first field in the first target parameter set comprises a target index, and the target index is the same as the first index.

According to one aspect of the present disclosure, comprising:
when the first flag is set, deleting a parameter set in the first storage space, and adding a first parameter set in the first storage space according to the first configuration;
herein, the first field, the second field and the third field in the first parameter set respectively comprise the first index, the first RRC configuration and the first condition.

According to one aspect of the present disclosure, comprising:
any parameter set in the first storage space comprising a fourth field, and the fourth field indicating a configuration status of a parameter set to which it belongs.

According to one aspect of the present disclosure, comprising:
the first receiver, when the first flag is set and a fourth field in the first target parameter set is set to a first status, reserving the first target parameter set.

According to one aspect of the present disclosure, comprising:
the first receiver, when the first flag is set and a fourth field in the first target parameter set is set to a second status, updating the first target parameter set to a first parameter set.

According to one aspect of the present disclosure, comprising:
the first receiver, when a target condition indicated by a third field in a parameter set in the first storage space is satisfied, applying a target configuration indicated by a second field in the parameter set; as a response to establishing a connection with a target cell, clearing a given parameter set in the first storage space, and a status indicated by a fourth field in the given parameter set being the same as a status indicated by a fourth field in the parameter set;
herein, the target condition and the target configuration are associated with the target cell.

The present disclosure provides a method in a second-type node for wireless communications, comprising:
transmitting a first signaling, the first signaling comprising a first flag, a first storage being processed according to the first flag;
herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

The present disclosure provides a first node for wireless communications, comprising:
a first receiver, receiving a first signaling, the first signaling comprising a first flag, processing a first storage space according to the first flag;
herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

The present disclosure provides a second-type node for wireless communications, comprising:
a second transmitter, transmitting a first signaling, the first signaling comprising a first flag, a first storage being processed according to the first flag;
herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

In one embodiment, the present disclosure has the following advantages over conventional schemes:
simultaneous CPC configurations of an MN and an SN are supported;
only one storage space is maintained instead of a plurality of storage spaces, which can avoid coordination of the plurality of storage spaces, thus simplifying the processing of the UE.
only one storage space is maintained, which can avoid a UE from confusing whether a CPC configuration originates from the first entity or the second entity;
when an MN and an SN configure a CPC at the same time, which is helpful for a UE to store or clear a new CPC configuration.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
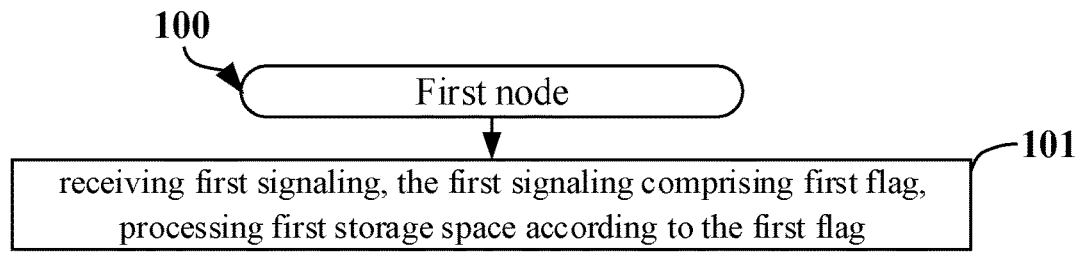
FIG. 1 is a flowchart of transmission of a first signaling according to one embodiment of the present disclosure.

Embodiment 1 illustrates a flowchart of transmission of a first signaling according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first node in the present disclosure receives a first signaling in step 101, the first signaling comprising a first flag, and processes a first storage space according to the first flag;

herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a nonnegative integer, the second field comprises a target configuration, and the third field comprises a target condition.

In one embodiment, the first signaling comprises all or part of an RRCReconfiguration message.

In one embodiment, the first signaling comprises all or part of an RRCConnectionReconfiguration message.

In one embodiment, the first signaling comprises a Radio Resource Control (RRC) message.

In one embodiment, the first signaling comprises all or partial IEs in an RRC message.

In one embodiment, the first signaling comprises all or partial fields in an IE in an RRC Message.

In one embodiment, the phrase of the first signaling being used for a conditional reconfiguration includes: the first signaling comprises a conditional reconfiguration.

In one embodiment, the phrase of a conditional reconfiguration comprises a Conditional Handover (CHO) configuration.

In one embodiment, the phrase of a conditional reconfiguration comprises a Conditional PSCell Addition (CPA) configuration.

In one embodiment, the phrase of a conditional reconfiguration comprises a Conditional PSCell Change (CPC) configuration.

In one embodiment, the phrase of a conditional reconfiguration comprises a Conditional PSCell Addition/Change (CPAC) configuration.

In one embodiment, the first signaling is transmitted through an SRB1.

In one embodiment, the first signaling is transmitted through an SRB2.

In one embodiment, the first signaling is transmitted through an SRB3.

In one embodiment, a transmitter of the first signaling comprises a maintenance base station of a PCell.

In one embodiment, a transmitter of the first signaling comprises a maintenance base station of a PSCell.

In one embodiment, the first signaling is used to add one parameter set in the first storage space.

In one embodiment, the first signaling is used to add a plurality of parameter sets in the first storage space.

In one embodiment, the behavior of processing a first storage space according to the first flag includes: different values of the first flag are used to determine different processing methods for the first storage space.

In one embodiment, the behavior of processing a first storage space according to the first flag includes: processing whole or part of the first storage space according to the first flag.

In one embodiment, the behavior of processing a first storage space according to the first flag includes: processing one or a plurality of parameter sets in the first storage space according to the first flag.

In one embodiment, processing the first storage space comprises: adding one or more parameter sets.

In one embodiment, processing the first storage space comprises: changing one or more parameter sets.

In one embodiment, processing the first storage space comprises: deleting one or more parameter sets.

In one embodiment, processing the first storage space comprises: replacing one or more parameter sets.

In one embodiment, processing the first storage space comprises: deleting all parameter sets in the first storage space.

In one embodiment, processing the first storage space comprises: clearing the first storage space.

In one embodiment, the first configuration comprises the first flag.

In one embodiment, the first signaling comprises a first configuration, and the first configuration comprises the first flag.

In one embodiment, the first configuration does not comprise the first flag.

In one embodiment, the first signaling comprises the first flag, and the first configuration comprises at least one of the first index, or the first RRC configuration or the first condition.

In one embodiment, the first configuration comprises all or partial IEs in an RRC message.

In one embodiment, the first configuration comprises all or partial fields in an IE in an RRC Message.

In one embodiment, the first configuration comprises all or part of an RRCReconfiguration message.

In one embodiment, the first configuration comprises all or part of an RRCConnectionReconfiguration message.

In one embodiment, the first configuration comprises all or part of a ConditionalReconfiguration IE.

In one embodiment, the first configuration comprises all or part of a ServingCellConfigCommon IE.

In one embodiment, the first configuration comprises all or part of a CellGroupConfig IE.

In one embodiment, the first configuration comprises all or part of an SCG-Configuration IE.

In one embodiment, the first configuration comprises all or part of an SCG-ConfigPartSCG IE.

In one embodiment, the first configuration comprises all or part of a PSCellToAddMod.

In one embodiment, the first configuration comprises all or part of a condConfigToAddModList IE.

In one embodiment, the first configuration comprises all or part of a condReconfigurationToAddModList IE.

In one embodiment, the first configuration comprises all or part of a condConfigId field.

In one embodiment, the first configuration comprises all or part of a condReconfigurationId field.

In one embodiment, the first configuration comprises all or part of a condExecutionCond field.

In one embodiment, the first configuration comprises all or part of a triggerCondition field.

In one embodiment, the first configuration comprises all or part of a condRRCReconfig field.

In one embodiment, the first configuration comprises all or part of a condReconfigurationToApply field.

In one embodiment, the first configuration is used to add one parameter set in the first storage space.

In one embodiment, the first configuration is used to add a plurality of parameter sets in the first storage space.

In one embodiment, the phrase of the first configuration comprising at least one of a first index, a first RRC configuration or a first condition includes: at least one of the first index, or the first RRC configuration or a first condition is all or partial fields in the first configuration.

In one embodiment, the phrase of the first configuration comprising at least one of a first index, a first RRC configuration or a first condition includes: at least one of the first index, or the first RRC configuration or the first condition is all or partial IEs in the first configuration.

In one embodiment, the phrase of the first configuration comprising at least one of a first index, a first RRC configuration or a first condition includes: the first configuration is used to determine at least one of the first index, or the first RRC configuration or the first condition.

In one embodiment, the first index is used to determine a parameter set in the first storage space.

In one embodiment, the first index is used to determine a parameter set.

In one embodiment, the first index comprises a non-negative integer.

In one embodiment, the first index comprises a positive integer.

In one embodiment, the first index is not greater than 8.
In one embodiment, the first index is not greater than 16.
In one embodiment, the first index is not greater than 32.
In one embodiment, the first index is not greater than 64.
In one embodiment, the first index is not greater than 128.

In one embodiment, the first index comprises all or part of a condConfigId field.

In one embodiment, the first index comprises all or part of a condReconfigurationId field.

In one embodiment, the first index comprises a measurement configuration ID.

In one embodiment, the first index comprises a measurement report ID.

In one embodiment, the first index comprises a cell ID.

In one embodiment, the first RRC configuration comprises all or part of an RRCReconfiguration message.

In one embodiment, the first RRC configuration comprises all or part of an RRCConnectionReconfiguration message.

In one embodiment, the first RRC configuration comprises all or partial IEs in an RRC message.

In one embodiment, the first RRC configuration comprises all or partial fields of an IE in an RRC Message.

In one embodiment, the first condition comprises a condition for executing PCell handover.

In one embodiment, the first condition comprises a condition for executing PSCell change.

In one embodiment, the first condition comprises a condition for executing PSCell addition.

In one embodiment, the first condition comprises an A3 event.

In one embodiment, the first condition comprises an A5 event.

In one embodiment, the first condition comprises all or part of a condExecutionCond.

In one embodiment, the first condition comprises all or part of a triggerCondition.

In one embodiment, the first condition comprises all or part of a condRRCReconfig.

In one embodiment, the first condition comprises all or part of a condReconfigurationToApply.

In one embodiment, the first signaling comprises a first configuration and a second configuration, the first configuration comprises at least one of a first index, or a first RRC configuration or a first condition, and the second configuration comprises at least one of a second index, or a second RRC configuration or a second condition.

In one subembodiment of the above embodiment, the second configuration comprises all or partial IEs in an RRC message.

In one subembodiment of the above embodiment, the second configuration comprises all or partial fields in an IE in an RRC Message.

In one subembodiment of the above embodiment, the second configuration comprises all or part of an RRCReconfiguration message.

In one subembodiment of the above embodiment, the second configuration comprises all or part of an RRCConnectionReconfiguration message.

In one subembodiment of the above embodiment, the second configuration comprises all or part of a ConditionalReconfiguration IE.

In one subembodiment of the above embodiment, the second configuration comprises all or part of a ServingCellConfigCommon IE.

In one subembodiment of the above embodiment, the second configuration comprises all or part of a CellGroupConfig IE.

In one subembodiment of the above embodiment, the second configuration comprises all or part of an SCG-Configuration IE.

In one subembodiment of the above embodiment, the second configuration comprises all or part of an SCG-ConfigPartSCG IE.

In one subembodiment of the above embodiment, the second configuration comprises all or part of a PSCellToAddMod.

In one subembodiment of the above embodiment, the second configuration comprises all or part of a condConfigToAddModList IE.

In one subembodiment of the above embodiment, the second configuration comprises all or part of a condReconfigurationToAddModList IE.

In one subembodiment of the above embodiment, the second configuration comprises all or part of a condConfigId field.

In one subembodiment of the above embodiment, the second configuration comprises all or part of a condReconfigurationId field.

In one subembodiment of the above embodiment, the second configuration comprises all or part of a condExecutionCond field.

In one subembodiment of the above embodiment, the second configuration comprises all or part of a triggerCondition field.

In one subembodiment of the above embodiment, the second configuration comprises all or part of a condRRCReconfig field.

In one subembodiment of the above embodiment, the second configuration comprises all or part of a condReconfigurationToApply field.

In one subembodiment of the above embodiment, the second index is used to determine a parameter set.

In one subembodiment of the above embodiment, the second index is used to determine a parameter set in the first storage space.

In one subembodiment of the above embodiment, the second index comprises a non-negative integer.

In one subembodiment of the above embodiment, the second index comprises a positive integer.

In one subembodiment of the above embodiment, the second index is not greater than 8.

In one subembodiment of the above embodiment, the second index is not greater than 16.

In one subembodiment of the above embodiment, the second index is not greater than 32.

In one subembodiment of the above embodiment, the second index is not greater than 64.

In one subembodiment of the above embodiment, the second index is not greater than 128.

In one subembodiment of the above embodiment, the second index comprises all or part of a condConfigId field.

In one subembodiment of the above embodiment, the second index comprises all or part of an acondReconfigurationId field.

In one subembodiment of the above embodiment, the first index is not equal to a second index.

In one subembodiment of the above embodiment, the first index is equal to a second index.

In one subembodiment of the above embodiment, the second RRC configuration comprises all or part of an RRCReconfiguration message.

In one subembodiment of the above embodiment, the second RRC configuration comprises all or part of an RRCConnectionReconfiguration message.

In one subembodiment of the above embodiment, the second RRC configuration comprises all or partial IEs in an RRC message.

In one subembodiment of the above embodiment, the second RRC configuration comprises all or partial fields in an IE in an RRC message.

In one subembodiment of the above embodiment, the second condition comprises a PCell handover condition.

In one subembodiment of the above embodiment, the second condition comprises a PSCell change condition.

In one subembodiment of the above embodiment, the second condition comprises a PSCell addition condition.

In one subembodiment of the above embodiment, the second condition comprises an A3 event.

In one subembodiment of the above embodiment, the second condition comprises an A5 event.

In one subembodiment of the above embodiment, the second condition comprises all or part of a condExecutionCond.

In one subembodiment of the above embodiment, the second condition comprises all or part of a triggerCondition.

In one subembodiment of the above embodiment, the second condition comprises all or part of a condRRCReconfig.

In one subembodiment of the above embodiment, the second condition comprises all or part of a condReconfigurationToApply.

In one embodiment, the phrase of any parameter set in the first storage space comprising a first field, a second field and a third field includes: any parameter set in the first storage space consists of the first field, the second field and the third field.

In one embodiment, the phrase of any parameter set in the first storage space comprising a first field, a second field and a third field includes: each parameter set stored in the first storage space comprises the first field, the second field and the third field.

In one embodiment, the phrase of any parameter set in the first storage space comprising a first field, a second field and a third field includes: any parameter set in the first storage comprises at least one of the first field, the second field or the third field.

In one embodiment, the phrase of any parameter set in the first storage space comprising a first field, a second field and a third field includes: any parameter set in the first storage comprises at least two of the first field, the second field and the third field.

In one embodiment, any parameter set in a first storage space is identified by a first index comprised in a first field in the parameter set.

In one embodiment, the first storage space stores at most K parameter set(s), K being a positive integer.

In one subembodiment of the embodiment, K is equal to 16.

In one subembodiment of the embodiment, K is equal to 32.

In one subembodiment of the embodiment, K is a positive integral multiple of 8.

In one subembodiment of the embodiment, K is a positive integer not greater than 4096.

In one subembodiment of the embodiment, before the first signaling is received, the first storage stores K1 parameter set(s), K1 being a non-negative integer not greater than K.

In one subsidiary embodiment of the above embodiment, K1 is equal to 0.

In one subsidiary embodiment of the above embodiment, K1 is greater than 0.

In one subsidiary embodiment of the above embodiment, K1 is a positive integer not greater than 4096.

In one subembodiment of the embodiment, the first storage space comprises a parameter set list, the parameter set list comprises K2 parameter set(s), and any parameter set in the K2 parameter set(s) comprises the first field, the second field and the third field, K2 being a non-negative integer not greater than K.

In one subsidiary embodiment of the above embodiment, K2 is equal to 0.

In one subsidiary embodiment of the above embodiment, K2 is greater than 0.

In one subsidiary embodiment of the above embodiment, K2 is a positive integer not greater than 4096.

In one embodiment, the first storage space comprises VarConditionalReconfig.

In one embodiment, a parameter set in the first storage space is configured by an MN.

In one embodiment, a parameter set in the first storage space is configured by an SN.

In one embodiment, a parameter set in the first storage space is used for a CPC of an inter-SN.

In one embodiment, a parameter set in the first storage space is used for a CPC of an intra-SN.

In one embodiment, a parameter set in the first storage space is used for a CPC.

In one embodiment, a parameter set in the first storage space is used for a CPA.

In one embodiment, any parameter set in the first storage space is used for a CPC of an inter-SN.

In one embodiment, any parameter set in the first storage space is used for a CPC of an intra-SN.

In one embodiment, two parameter sets in the first storage space are respectively used for a CPC of an inter-SN and a CPC of an intra-SN.

In one embodiment, two parameter sets in the first storage space are respectively used for a CPC and a CPA.

In one embodiment, the phrase of the first field comprising a target index includes: the first field indicates a target index.

In one embodiment, the phrase of the second field comprising a target configuration includes: the second field indicates a target configuration.

In one embodiment, the phrase of the third field comprising a target condition includes: the third field indicates a target condition.

In one embodiment, the target index is used to determine a parameter set in the first storage space.

In one embodiment, the target index is not greater than 8.

In one embodiment, the target index is not greater than 16.

In one embodiment, the target index is not greater than 32.

In one embodiment, the target index is not greater than 64.

In one embodiment, the target index is not greater than 128.

In one embodiment, the target index comprises all or part of a condConfigId field.

In one embodiment, the target index comprises all or part of a condReconfigurationId field.

In one embodiment, the target configuration comprises all or part of an RRCReconfiguration message.

In one embodiment, the target configuration comprises all or part of an RRCConnectionReconfiguration message.

In one embodiment, the target configuration comprises all or partial IEs in an RRC message.

In one embodiment, the target configuration comprises all or partial fields in an IE in an RRC Message.

In one embodiment, the target condition comprises a condition for executing PCell handover.

In one embodiment, the target condition comprises a condition for executing PSCell change.

In one embodiment, the target condition comprises a condition for executing PSCell addition.

In one embodiment, the target condition comprises an A3 event.

In one embodiment, the target condition comprises an A5 event.

In one embodiment, the target condition comprises all or part of a condExecutionCond.

In one embodiment, the target condition comprises all or part of a triggerCondition.

In one embodiment, the target condition comprises all or part of a condRRCReconfig.

In one embodiment, the target condition comprises all or part of a condReconfigurationToApply.

In one embodiment, the first flag comprises N1 bit(s), N1 being a positive integer.

In one subembodiment of the embodiment, N1 is equal to 1.

In one subsidiary embodiment of the subembodiment, the first flag is set to 1 to represent that the first flag is set.

In one subsidiary embodiment of the subembodiment, the first flag is set to 0 to represent that the first flag is set.

In one subsidiary embodiment of the subembodiment, the first flag is set to 1 to represent that the first flag is not set.

In one subsidiary embodiment of the subembodiment, the first flag is set to 0 to represent that the first flag is not set.

In one subembodiment of the embodiment, N1 is equal to 2.

In one subembodiment of the embodiment, N1 is greater than 2.

In one subembodiment of the embodiment, N1 is no greater than 8.

In one subembodiment of the embodiment, N1 is not greater than 1024.

In one subembodiment of the embodiment, N1 is equal to a number of parameter sets stored in the first storage space, and the N1 bit(s) respectively correspond to parameter set(s) stored in the first storage space.

In one subsidiary embodiment of the above subembodiment, a first bit in the N1 bit(s) corresponds to a first parameter set in the first storage space; and a second bit in the N1 bit(s) corresponds to a second parameter set in the first storage space, and so on.

In one subsidiary embodiment of the above subembodiment, an N1th bit in the N1 bit(s) corresponds to a first parameter set in the first storage space; an N1-1th bit in the N1 bit(s) corresponds to a second parameter set in the first storage space, and so on.

In one subembodiment of the embodiment, N1 is less than a number of parameter sets stored in the first storage space.

In one subembodiment of the embodiment, N1 is greater than a number of parameter sets stored in the first storage space.

In one subembodiment of the embodiment, N1 is less than or equal to a maximum number of parameter sets that can be stored in the first storage space.

In one subsidiary embodiment of the above embodiment, any bit in the N1 bit(s) is set to 1 to represent that the first flag is set.

In one subsidiary embodiment of the above subembodiment, any bit in the N1 bit(s) is set to 0 to represent that the first flag is set.

In one subsidiary embodiment of the above subembodiment, any bit in the N1 bit(s) is set to 1 to represent that the first flag is not set.

In one subsidiary embodiment of the above subembodiment, any bit in the N1 bit(s) is set to 0 to represent that the first flag is not set.

In one embodiment, the first flag comprises a bitmap, and the bitmap comprises N2 bit(s), N2 being a positive integer.

In one subembodiment of the embodiment, N2 is equal to a number of parameter sets stored in the first storage space, and the N2 bit(s) corresponds (respectively correspond) to parameter set(s) stored in the first storage space.

In one subembodiment of the embodiment, N2 is less than a number of parameter sets stored in the first storage space.

In one subembodiment of the embodiment, N2 is greater than a number of parameter sets stored in the first storage space.

In one subembodiment of the embodiment, N2 is less than or equal to a maximum number of parameter sets that can be stored in the first storage space.

In one embodiment, the first flag is an Enumeration Variable.

In one embodiment, the first flag is set to 1 to represent that the first flag is set.

In one embodiment, the first flag is set to 0 to represent that the first flag is set.

In one embodiment, the first flag is a Boolean Variable.

In one embodiment, the first flag is set to true to represent that the first flag is set.

In one embodiment, the first flag is set to false to represent that the first flag is set.

In one embodiment, the first flag is set to true to represent that the first flag is not set.

In one embodiment, the first flag is set to false to represent that the first flag is not set.

In one embodiment, the first flag exists to represent that the first flag is set.

In one embodiment, the first flag does not exist to represent that the first flag is set.

In one embodiment, the first flag exists to represent that the first flag is not set.

In one embodiment, the first flag does not exist to represent that the first flag is not set.

In one embodiment, a problem to be solved in the present disclosure includes: when a UE receives a CPC configuration originating from an MN and an SN, how does the UE process it.

In one embodiment, advantages of the above method include supporting simultaneous CPC configurations of an MN and an SN.

In one embodiment, advantages of the above method include that a UE can only maintain one storage space instead of a plurality of storage spaces, which can avoid coordination of the plurality of storage spaces, thus simplifying the processing of the UE.

Embodiment 2

Figure 2:
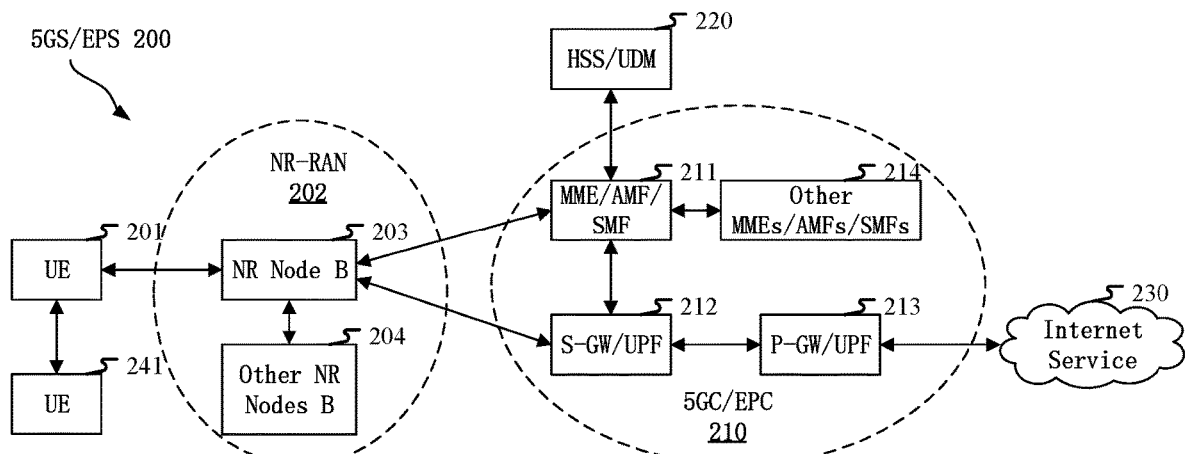
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN communications.

In one embodiment, the UE 201 supports communications within networks with large delay differences.

In one embodiment, the UE 201 supports Terrestrial Networks (TN) communications.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is a IoT terminal.

In one embodiment, the UE 201 is an Industrial IoT terminal.

In one embodiment, the UE 201 is a device supporting transmission with low-delay and high-reliability.

In one embodiment, the gNB 203 corresponds to the second-type node in the present disclosure.

In one subembodiment of the embodiment, the second-type node comprises the second node in the present disclosure.

In one subembodiment of the embodiment, the second-type node comprises the third node in the present disclosure.

In one embodiment, the gNB 203 comprises an MN.

In one embodiment, the gNB 203 comprises an SN.

In one embodiment, the gNB 203 comprises a Basestation (BS).

In one embodiment, the gNB 203 comprises a UE.

In one embodiment, the gNB 203 supports communications within NTN.

In one embodiment, the gNB 203 supports communications within networks with large delay differences.

In one embodiment, the gNB 203 supports communications within TN.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station supporting large delay differences.

In one embodiment, the gNB 203 is a flight platform.

In one embodiment, the gNB 203 is satellite equipment.

In one embodiment, the gNB 203 is a UE.

In one embodiment, the gNB 203 is a gateway.

In one embodiment, the gNB 203 is a base station supporting NR.

In one embodiment, the gNB 203 is a base station supporting EUTRA.

In one embodiment, the gNB 203 is a base station supporting WLAN.

In one embodiment, the gNB 203 is a base station supporting BT.

Embodiment 3

Figure 3:
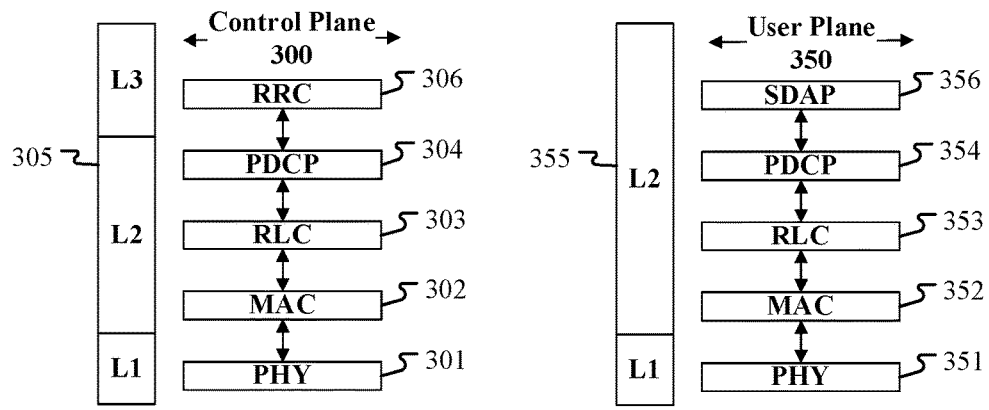
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present disclosure.

In one embodiment, the radio protocol architecture in FIG. 3 is applicable to the second-type node in the present disclosure.

In one subembodiment of the embodiment, the second-type node comprises the second node in the present disclosure.

In one subembodiment of the embodiment, the second-type node comprises the third node in the present disclosure.

In one embodiment, the first signaling in the present disclosure is generated by the RRC 306.

In one embodiment, the second signaling in the present disclosure is generated by the RRC 306.

In one embodiment, the third signaling in the present disclosure is generated by the RRC 306.

In one embodiment, the fourth signaling in the present disclosure is generated by the RRC 306.

In one embodiment, the fifth signaling in the present disclosure is generated by the RRC 306.

Embodiment 4

Figure 4:
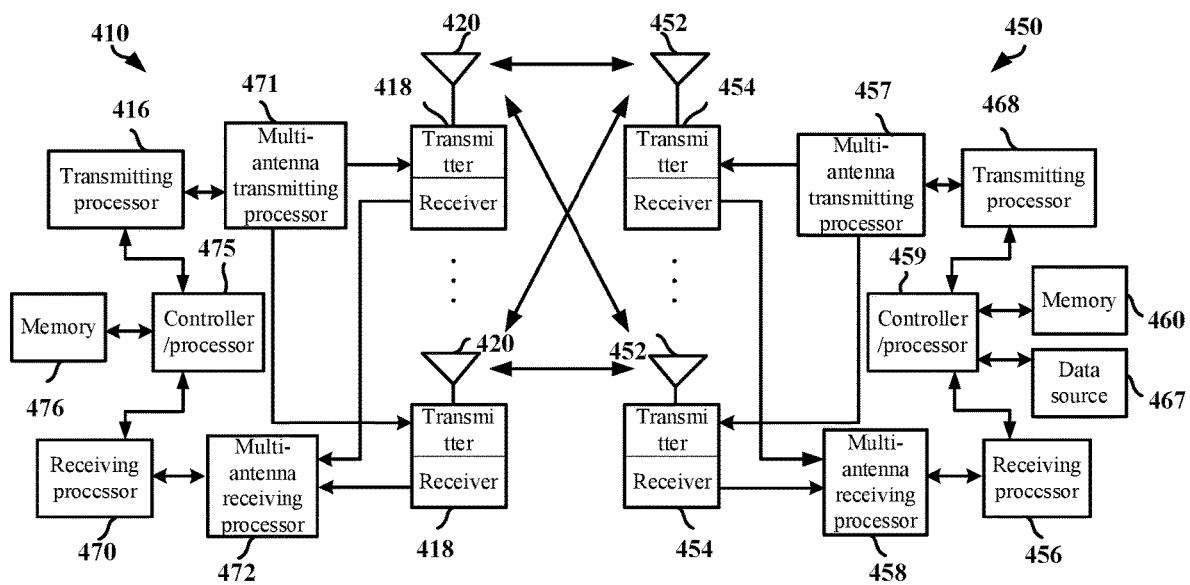
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory, at least one processor and at least one memory. The at least one memory comprises computer program codes; the at least one memory and the computer program codes are configured to be used in collaboration with the at least one processor, the first communication device 450 at least receives a first signaling, the first signaling comprising a first flag, and processes a first storage space according to the first flag; herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

In one embodiment, the first communication device 450 comprises at least one processor and at least one memory, a memory that stores a computer readable instruction program. The computer readable instruction program generates an action when executed by at least one processor. The action includes: receiving a first signaling, the first signaling comprising a first flag, and processing a first storage space according to the first flag; herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling, the first signaling comprising a first flag, and a first storage is processed according to the first flag; herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

In one embodiment, the second communication device 410 comprises a memory that stores a computer readable instruction program. The computer readable instruction program generates an action when executed by at least one processor. The action includes: transmitting a first signaling, the first signaling comprising a first flag, and a first storage being processed according to the first flag; herein, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

In one embodiment, the antenna 452, the receiver 454, the receiving processor 456, and the controller/processor 459 are used to receive a first configuration; at least one of the antenna 420, the transmitter 418, the transmitting processor 416, or the controller/processor 475 is used to receive a first signaling.

In one embodiment, the antenna 452, the receiver 454, the receiving processor 456, and the controller/processor 459 are used to receive a second configuration; at least one of the antenna 420, the transmitter 418, the transmitting processor 416, or the controller/processor 475 is used to receive a second signaling.

In one embodiment, the antenna 452, the receiver 454, the receiving processor 456, and the controller/processor 459 are used to receive a second configuration; at least one of the antenna 420, the transmitter 418, the transmitting processor 416, or the controller/processor 475 is used to receive a third signaling.

In one embodiment, the antenna 452, the receiver 454, the receiving processor 456, and the controller/processor 459 are used to receive a second configuration; at least one of the antenna 420, the transmitter 418, the transmitting processor 416, or the controller/processor 475 is used to receive a fourth signaling.

In one embodiment, the antenna 452, the receiver 454, the receiving processor 456, and the controller/processor 459 are used to receive a second configuration; at least one of the antenna 420, the transmitter 418, the transmitting processor 416, or the controller/processor 475 is used to receive a fifth signaling.

In one embodiment, the antenna 452, the transmitter 454, the transmitting processor 468, and the controller/processor 459 are used to transmit a first signaling; at least one of the antenna 420, the receiver 418, the receiving processor 470, or the controller/processor 475 is used to transmit a first signaling.

In one embodiment, the antenna 452, the transmitter 454, the transmitting processor 468, and the controller/processor 459 are used to transmit a second signaling; at least one of the antenna 420, the receiver 418, the receiving processor 470, or the controller/processor 475 is used to transmit a second signaling.

In one embodiment, the antenna 452, the transmitter 454, the transmitting processor 468, and the controller/processor 459 are used to transmit a first signaling; at least one of the antenna 420, the receiver 418, the receiving processor 470, or the controller/processor 475 is used to transmit a third signaling.

In one embodiment, the antenna 452, the transmitter 454, the transmitting processor 468, and the controller/processor 459 are used to transmit a second signaling; at least one of the antenna 420, the receiver 418, the receiving processor 470, or the controller/processor 475 is used to transmit a fourth signaling.

In one embodiment, the antenna 452, the transmitter 454, the transmitting processor 468, and the controller/processor 459 are used to transmit a second signaling; at least one of the antenna 420, the receiver 418, the receiving processor 470, or the controller/processor 475 is used to transmit a fifth signaling.

In one embodiment, the first communication device 450 corresponds to the first node in the present disclosure.

In one embodiment, the second communication device 410 corresponds to the second-type node in the present disclosure.

In one subembodiment of the embodiment, the second-type node comprises the second node in the present disclosure.

In one subembodiment of the embodiment, the second-type node comprises the third node in the present disclosure.

In one embodiment, the first communication device 450 is a UE.

In one embodiment, the first communication device 450 is a UE supporting large delay inequality.

In one embodiment, the first communication device 450 is a UE supporting NTN.

In one embodiment, the first communication device 450 is an aircraft device.

In one embodiment, the first communication device 450 has a positioning capability.

In one embodiment, the first communication device 450 does not have a positioning capability.

In one embodiment, the first communication device 450 is a UE supporting TN.

In one embodiment, the second communication device 410 is a base station (gNB/eNB/ng-eNB).

In one embodiment, the second communication device 410 is a base station supporting large delay differences.

In one embodiment, the second communication device 410 is a base station supporting NTN.

In one embodiment, the second communication device 410 is a satellite equipment.

In one embodiment, the second communication device 410 is flying platform equipment.

In one embodiment, the second communication device 410 is a base station supporting TN.

In one embodiment, the second communication device 410 is a UE.

Embodiment 5

Figure 5:
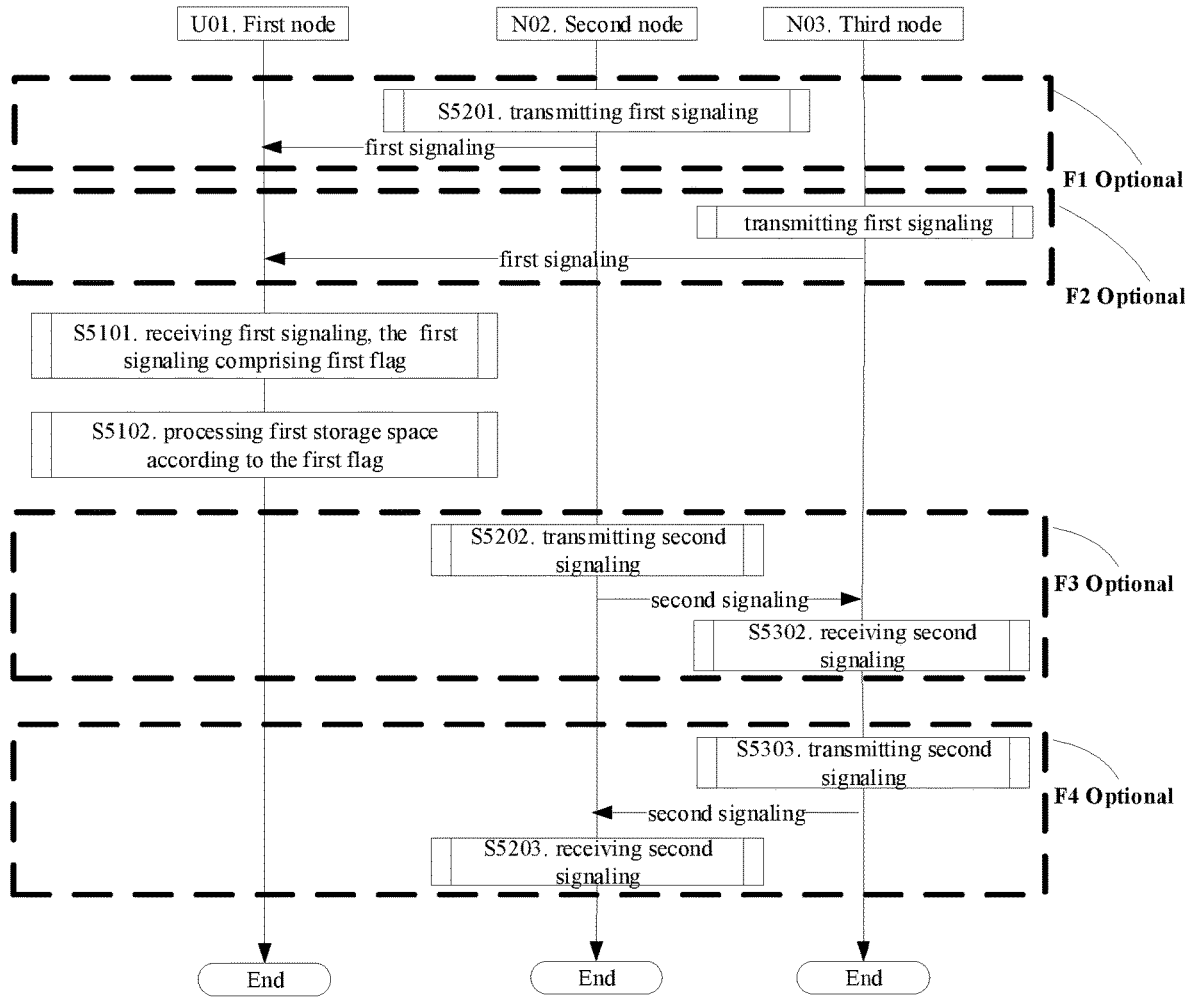
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. It is particularly underlined that the order illustrated in the embodiment does not put constraints over sequences of signal transmissions and implementations.

The first node U01 receives a first signaling in step S5101, the first signaling comprising a first flag; and processes a first storage space according to the first flag in step S5102;
   the second node N02 transmits a first signaling in step S5201; transmits a second signaling in step S102; and receives a second signaling in step S5203;
   the third node N03 transmits a first signaling in step S5301; receives a second signaling in step S5302; and transmits a second signaling in step S5303;

In embodiment 5, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target configuration, and the third field comprises a target condition; the second signaling indicates that a parameter set in the first storage space is deleted.

In one embodiment, the first signaling is transmitted on a UU reception.

In one embodiment, the first signaling is transmitted on a UU reception.

In one embodiment, as a response to transmitting the first signaling, the second signaling is transmitted.

In one embodiment, as a response to the first flag being set, the second signaling is transmitted.

In one embodiment, the second signaling is transmitted on a Xn reception.

In one embodiment, the second signaling is transmitted on a X2 reception.

In one embodiment, the second signaling is transmitted before the first signaling.

In one embodiment, the second signaling is transmitted after the first signaling.

In one embodiment, the phrase of the second signaling indicating that a parameter set in the first storage space is deleted includes: the second signaling indicates that one or a plurality of parameter sets in the first storage space are deleted.

In one embodiment, the phrase of the second signaling indicating that a parameter set in the first storage space is deleted includes: the second signaling indicates that all parameter sets in the first storage space are deleted.

In one embodiment, the phrase of the second signaling indicating that a parameter set in the first storage space is deleted includes: the second signaling indicates that the first storage space is cleared.

In one embodiment, the phrase of the second signaling indicating that a parameter set in the first storage space is deleted includes: the second signaling indicates that the first flag is set.

In one embodiment, the phrase of the second signaling indicating that a parameter set in the first storage space is deleted includes: the second signaling indicates that a parameter set corresponding to the first index is deleted.

In one subembodiment of the embodiment, the phrase of a parameter set corresponding to the first index includes: a parameter set corresponding to the first index is a parameter set in the first storage space, and a target index comprised in a first field in the parameter set is the same as the first index.

In one embodiment, the phrase of the second signaling indicating that a parameter set in the first storage space is deleted includes: the second signaling indicates that a parameter set in a first storage space corresponding to the first node U01 is deleted.

In one embodiment, the second signaling comprises a first identity (ID), and the first node N01 is identified by the first ID.

In one subembodiment of the embodiment, the first ID comprises a C-RNTI.

In one subembodiment of the embodiment, a number of bit(s) comprised in the first ID is a positive integral number of 8.

In one subembodiment of the embodiment, the first ID comprises a positive integer.

In one subembodiment of the embodiment, the first ID comprises a non-negative integer.

In one embodiment, the second signaling comprises the first index.

In one embodiment, the second signaling comprises an index list, and the index list comprises at least one index.

In one subembodiment of the embodiment, the second signaling indicates that a parameter set corresponding to any index in the first index list is deleted, and the first parameter set belongs to the first storage space.

In one subembodiment of the embodiment, the first index is an index in the index list.

In one subembodiment of the embodiment, the index list does not comprise the first index.

In one embodiment, any index in the index list is used to determine a parameter set in the first storage space.

In one embodiment, any index in the index list comprises a non-negative integer.

In one embodiment, any index in the index list comprises a positive integer.

In one embodiment, any index in the index list is not greater than 8.

In one embodiment, any index in the index list is not greater than 16.

In one embodiment, any index in the index list is not greater than 32.

In one embodiment, any index in the index list is not greater than 64.

In one embodiment, any index in the index list is not greater than 128.

In one embodiment, as a response to receiving the second signaling, a conditional reconfiguration performed on the first node U01 is deleted.

In one embodiment, a receiving node of the second signaling deletes a conditional reconfiguration performed on the first node U01.

In one embodiment, the second signaling is received by a second node.

In one embodiment, the second signaling is received by a third node.

In one embodiment, the second node comprises an MN.

In one embodiment, the second node comprises an SN.

In one embodiment, the third node comprises an MN.

In one embodiment, the third node comprises an SN.

In one embodiment, the second node comprises an MN, and the third node comprises an SN.

In one embodiment, the second node comprises an SN, and the third node comprises an NN.

In one embodiment, the box F1 framed with dotted lines is optional.

In one embodiment, the box F1 framed with dotted lines exists.

In one embodiment, the box F1 framed with dotted lines does not exist.

In one embodiment, the box F2 framed with dotted lines is optional.

In one embodiment, the box F2 framed with dotted lines exists.

In one embodiment, the box F2 framed with dotted lines does not exist.

In one embodiment, the box F3 framed with dotted lines is optional.

In one embodiment, the box F3 framed with dotted lines exists.

In one embodiment, the box F3 framed with dotted lines does not exist.

In one embodiment, the box F4 framed with dotted lines is optional.

In one embodiment, the box F4 framed with dotted lines exists.

In one embodiment, the box F4 framed with dotted lines does not exist.

In one embodiment, the box F1 framed with dotted lines exists, the box F2 framed with dotted lines does not exist, the box F3 framed with dotted lines does not exist, and the box F4 framed with dotted lines does not exist.

In one embodiment, the box F2 framed with dotted lines exists, the box F1 framed with dotted lines does not exist, the box F3 framed with dotted lines does not exist, and the box F4 framed with dotted lines does not exist.

In one embodiment, the box F1 framed with dotted lines exists, the box F2 framed with dotted lines does not exist, the box F3 framed with dotted lines exists, and the box F4 framed with dotted lines does not exist.

In one embodiment, the box F2 framed with dotted lines exists, the box F1 framed with dotted lines does not exist, the box F3 framed with dotted lines does not exist, and the box F4 framed with dotted lines exists.

Embodiment 6

Figure 6:
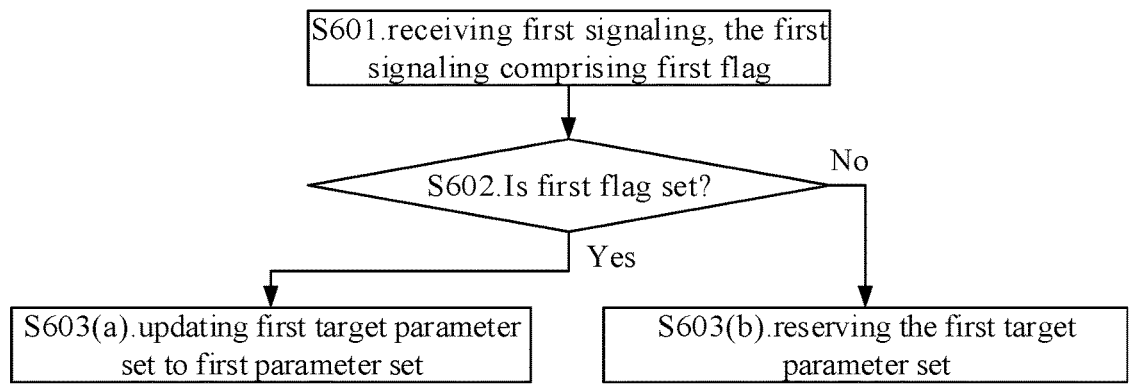
FIG. 6 illustrates a flowchart of a first node executing a conditional reconfiguration according to one embodiment of the present disclosure.

Embodiment 6 illustrates a flowchart of a first node executing a conditional reconfiguration according to one embodiment in the present disclosure, as shown in FIG. 6. It is particularly underlined that the order illustrated in the embodiment does not put constraints over sequences of implementation of steps.

In embodiment 6, the first node receives a first signaling in step S601, and the first signaling comprises a first flag; judges whether the first flag is set in step S602, if the first flag is set, goes to step S603(a), otherwise, goes to step S603(b); in step S603(a), updates a first target parameter set to a first parameter set; and in step S603 (b), reserves the first target parameter set.

In one embodiment, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target configuration, and the third field comprises a target condition.

In one embodiment, the first target parameter set in the present disclosure is a set in the first storage space; a first field in the first target parameter set comprises a target index, and the target index is the same as the first index.

In one embodiment, the first target parameter set in the present disclosure is a set in the first storage space; and a target index comprised in a first field in the first target parameter set is the same as the first index.

In one embodiment, the first target parameter set in the present disclosure is a set in the first storage space; and a first field in the first target parameter set comprises the first index.

In one embodiment, the first field, the second field and the third field in the first parameter set in the present disclosure respectively comprise the first index, the first RRC configuration and the first condition.

In one subembodiment of the embodiment, the phrase of "the first field, the second field and the third field in the first parameter set respectively comprising the first condition, the first index and the first cell ID" includes: the first parameter set comprises the first field, the second field and the third field, and the first field, the second field and the third field respectively indicate the first index, the first RRC configuration and the first condition.

In one embodiment, the phrase of "the first field, the second field and the third field in the first parameter set respectively comprising the first condition, the first index and the first cell ID" includes: the first index, the first RRC configuration and the first condition are respectively stored in the first field, the second field and the third field in the first parameter set.

In one embodiment, the first field in the first parameter set in the present disclosure comprises the first index.

In one embodiment, the second field in the first parameter set in the present disclosure comprises the first RRC configuration.

In one embodiment, the third field in the first parameter set in the present disclosure comprises the first condition.

In one embodiment, the first parameter set in the present disclosure is completely the same as the first target parameter set.

In one embodiment, the first parameter set in the present disclosure is partially the same as the first target parameter set.

In one embodiment, the first field in the first parameter set is the same as the first field in the first target parameter set.

In one embodiment, the second field in the first parameter set in the present disclosure is the same as the second field in the first target parameter set.

In one embodiment, the second field in the first parameter set in the present disclosure is different from the second field in the first target parameter set.

In one embodiment, the third field in the first parameter set in the present disclosure is the same as the third field in the first target parameter set.

In one embodiment, the third field in the first parameter set in the present disclosure is different from the third field in the first target parameter set.

In one embodiment, the first field in the first parameter set in the present disclosure is the same as the first field in the first target parameter set, and the second field in the first parameter set is the same as the second field in the first target parameter set.

In one embodiment, the first field in the first parameter set in the present disclosure is the same as the first field in the first target parameter set, and the second field in the first parameter set is different from the second field in the first target parameter set.

In one embodiment, the first field in the first parameter set in the present disclosure is the same as the first field in the first target parameter set, and the third field in the first parameter set is the same as the third field in the first target parameter set.

In one embodiment, the first field in the first parameter set in the present disclosure is the same as the first field in the first target parameter set, and the third field in the first parameter set is different from the third field in the first target parameter set.

In one embodiment, the second field in the first parameter set in the present disclosure is the same as the second field in the first target parameter set, and the third field in the first parameter set is the same as the third field in the first target parameter set.

In one embodiment, the second field in the first parameter set in the present disclosure is the same as the second field in the first target parameter set, and the third field in the first parameter set is different from the third field in the first target parameter set.

In one embodiment, the second field in the first parameter set in the present disclosure is different from the second field in the first target parameter set, and the third field in the first parameter set is the same as the third field in the first target parameter set.

In one embodiment, the second field in the first parameter set in the present disclosure is the same as the second field in the first target parameter set, and the third field in the first parameter set is the same as the third field in the first target parameter set.

In one embodiment, the behavior of updating a first target parameter set to a first parameter set includes: when a first target parameter set exists, updating the first target parameter set to a first parameter set.

In one embodiment, the behavior of updating a first target parameter set to a first parameter set includes: deleting the first target parameter set, and storing the first parameter set.

In one embodiment, the behavior of updating a first target parameter set to a first parameter set includes: replacing a first target parameter set with the first parameter set.

In one embodiment, the behavior of updating a first target parameter set to a first parameter set includes: replacing partial fields in the first target parameter set with partial fields in the first parameter set.

In one subembodiment of the embodiment, the partial fields comprise the first field.

In one subembodiment of the embodiment, the partial fields comprise the second field.

In one subembodiment of the embodiment, the partial fields comprise the third field.

In one subembodiment of the embodiment, the partial fields comprise a different part in the first parameter set and the first target set.

In one embodiment, the behavior of updating a first target parameter set to a first parameter set includes: updating the first target parameter set according to the first configuration.

In one embodiment, the behavior of updating a first target parameter set to a first parameter set includes: updating a target index comprised in a first field in a first target parameter set to the first index.

In one embodiment, the behavior of updating a first target parameter set to a first parameter set includes: updating a target configuration comprised in a second field in a first target parameter set to the first RRC configuration.

In one embodiment, the behavior of updating a first target parameter set to a first parameter set includes: updating a target condition comprised in a third field in a first target parameter set to the first condition.

In one embodiment, the behavior of updating in the present disclosure includes changing.

In one embodiment, the behavior of updating in the present disclosure includes replacing.

In one embodiment, the behavior of updating in the present disclosure includes storing.

In one embodiment, the behavior of updating in the present disclosure includes covering.

In one embodiment, as a response to updating a first target parameter set to a first parameter set, a fifth signaling is transmitted.

In one subembodiment of the embodiment, the fifth signaling indicates that a first target parameter set is updated to a first parameter set.

In one subembodiment of the embodiment, the fifth signaling comprises an RRCconnectionreconfigurationcomplete message.

In one subembodiment of the embodiment, the fifth signaling comprises all or part of an RRC signaling.

In one subembodiment of the embodiment, the fifth signaling comprises all or partial Information Elements (IEs) in an RRC message.

In one subembodiment of the embodiment, the fifth signaling comprises all or partial fields in an IE in an RRC Message.

In one subembodiment of the embodiment, the fifth signaling comprises the first index.

In one subembodiment of the embodiment, a receiving node of the fifth signaling releases a conditional reconfiguration performed on the first node.

In one subembodiment of the embodiment, when the first signaling originates from the first entity, the fifth signaling is received by the second entity.

In one subembodiment of the embodiment, when the first signaling originates from the second entity, the fifth signaling is received by the first entity.

In one subembodiment of the embodiment, when the first signaling is transmitted by the second node, the fifth signaling is received by the third node.

In one subembodiment of the embodiment, when the first signaling is transmitted by the third node, the fifth signaling is received by the second node.

In one subembodiment of the embodiment, the fifth signaling is received by the second node.

In one subembodiment of the embodiment, the fifth signaling is received by the third node.

In one subembodiment of the embodiment, the fifth signaling is received by the second entity.

In one subembodiment of the embodiment, the fifth signaling is received by the third entity.

In one embodiment, when the first flag is not set, and if there does not exist a first target parameter group, the first parameter set is added in the first storage space.

In one embodiment, when the first flag is set, and if there does not exist a first target parameter group, the first parameter set is added in the first storage space.

In one embodiment, if there does not exist a first target parameter group, the first parameter set is added in the first storage space.

In one embodiment, the phrase of adding the first parameter set in the first storage space in the present disclosure includes: storing the first parameter set in the first storage space.

In one embodiment, the phrase of adding the first parameter set in the first storage space includes: adding the first parameter set as a new parameter set to the first storage space.

In one embodiment, the first configuration is deleted in step S603(b).

In one embodiment, the behavior of reserving the first target parameter set includes: reserving the stored first target parameter set.

Embodiment 7

Figures 7, 8:
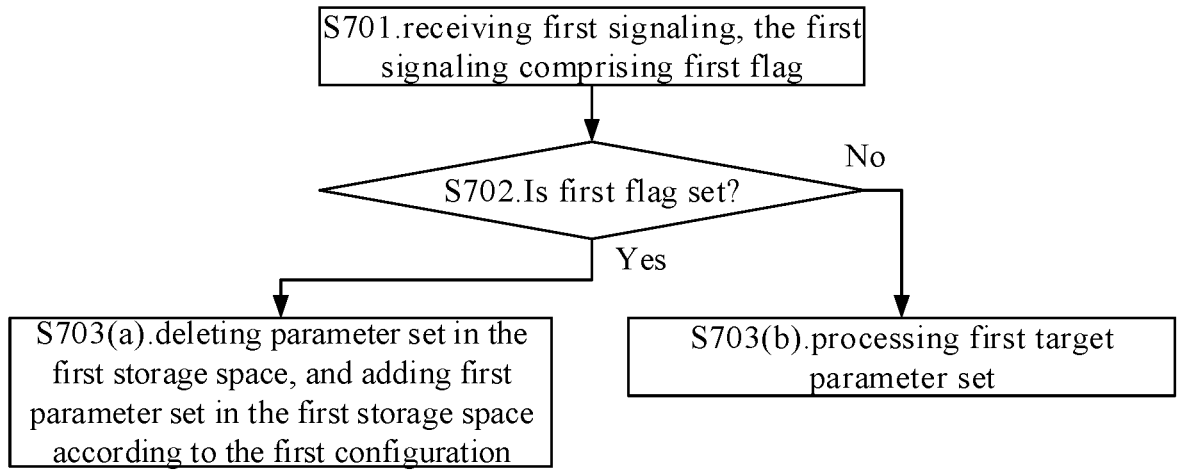
FIG. 7 illustrates a flowchart of a first node executing a conditional reconfiguration according to another embodiment of the present disclosure.
FIG. 8 illustrates a schematic diagram of a structure of a first storage space according to one embodiment of the present disclosure.

Embodiment 7 illustrates a flowchart of a first node executing a conditional reconfiguration according to another embodiment in the present disclosure, as shown in FIG. 7. It is particularly underlined that the order illustrated in the embodiment does not put constraints over sequences of implementation of steps.

In embodiment 7, the first node receives a first signaling in step S701, the first signaling comprises a first flag; judges whether the first flag is set in step S702, if the first flag is set, goes to step S703(a), otherwise, goes to step S703(b); in step S703(a), deletes a parameter set in the first storage space, and adds a first parameter set in the first storage space according to the first configuration; in step S703(b), processes a first target parameter set.

In one embodiment, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target configuration, and the third field comprises a target condition.

In one embodiment, the first field, the second field and the third field in the first parameter set in the present disclosure respectively comprise the first index, the first RRC configuration and the first condition.

In one subembodiment of the embodiment, the phrase of "the first field, the second field and the third field in the first parameter set respectively comprising the first condition, the first index and the first cell ID" includes: the first parameter set comprises the first field, the second field and the third field, and the first field, the second field and the third field respectively indicate the first index, the first RRC configuration and the first condition.

In one embodiment, the phrase of "the first field, the second field and the third field in the first parameter set respectively comprising the first condition, the first index and the first cell ID" includes: the first index, the first RRC configuration and the first condition are respectively stored in the first field, the second field and the third field in the first parameter set.

In one embodiment, the first field in the first parameter set in the present disclosure comprises the first index.

In one embodiment, the second field in the first parameter set in the present disclosure comprises the first RRC configuration.

In one embodiment, the third field in the first parameter set in the present disclosure comprises the first condition.

In one embodiment, the first target parameter set in the present disclosure is a set in the first storage space; and a first field in the first target parameter set comprises a target index, and the target index is the same as the first index.

In one embodiment, the behavior of deleting a parameter set in the first storage space includes: deleting all parameter sets in the first storage space.

In one embodiment, the behavior of deleting a parameter set in the first storage space includes: deleting each parameter set in the first storage space.

In one embodiment, the behavior of deleting a parameter set in the first storage space includes: clearing the first storage space.

In one embodiment, the first node U01 transmits a third signaling.

In one subembodiment of the embodiment, as a response to the behavior of deleting a parameter set in the first storage space, a third signaling is transmitted.

In one subembodiment of the embodiment, the third signaling indicates that a parameter set in a first storage space is deleted.

In one subembodiment of the embodiment, the third signaling comprises an RRCconnectionreconfigurationcomplete message.

In one subembodiment of the embodiment, the third signaling comprises all or part of an RRC signaling.

In one subembodiment of the embodiment, the third signaling comprises all or partial IEs in an RRC message.

In one subembodiment of the embodiment, the third signaling comprises all or partial fields in an IE in an RRC Message.

In one subembodiment of the embodiment, the third signaling indicates an ID of the first node.

In one subembodiment of the embodiment, a receiving node of the third signaling releases a conditional reconfiguration performed on the first node.

In one subembodiment of the embodiment, when the first signaling originates from the first entity, the third signaling is received by the second entity.

In one subembodiment of the embodiment, when the first signaling originates from the second entity, the third signaling is received by the first entity.

In one subembodiment of the embodiment, when the first signaling is transmitted by the second node, the third signaling is received by the third node.

In one subembodiment of the embodiment, when the first signaling is transmitted by the third node, the third signaling is received by the second node.

In one subembodiment of the embodiment, the third signaling is received by the second node.

In one subembodiment of the embodiment, the third signaling is received by the third node.

In one subembodiment of the embodiment, the third signaling is received by the second entity.

In one subembodiment of the embodiment, the third signaling is received by the third entity.

In one embodiment, the behavior of processing a first target parameter set includes if there exists a first target parameter set, reserving the first target parameter set.

In one embodiment, the behavior of processing a first target parameter set includes if there does not exist a first target parameter group, adding a first parameter set in the first storage space.

In one embodiment, the behavior of processing a first target parameter set includes if there exists a first target parameter set, reserving the first target parameter set; and if there does not exist a first target parameter group, adding a first parameter set in the first storage space.

In one embodiment, the behavior of processing a first target parameter set includes if there exists a first target parameter set, updating the first target parameter set to the first parameter set.

In one embodiment, as a response to receiving the third signaling, the second signaling is transmitted.

Embodiment 8

Embodiment 8 illustrates another schematic diagram of a structure of a first storage space according to one embodiment of the present disclosure, as shown in FIG. 8. In FIG. 8, the symbol "—ASN1START" represents a start of an ASN message; the symbol "—ASN1STOP" represents an end of an ASN message; the symbol "—TAG-FIRST STORAGE SPACE-START" represents a start of the first storage space variable; the symbol "—TAG-FIRST STORAGE SPACE-STOP" represents an end of the first storage space variable; the symbol "::=" represents being defined as or being equivalent to.

In embodiment 8, any parameter set in the first storage space comprises a fourth field, and the fourth field indicates a configuration status of a parameter set to which it belongs.

In one embodiment, the phrase of the fourth field indicating a configuration status of a parameter set to which it belongs includes: the fourth field indicates that a parameter set to which it belongs is for an intra-SN CPC or an inter-SN CPC.

In one embodiment, the phrase of the fourth field indicating a configuration status of a parameter set to which it belongs includes: the fourth field indicates that a parameter set to which it belongs is for a CPA or a CPC.

In one embodiment, the phrase of the fourth field indicating a configuration status of a parameter set to which it belongs includes: the fourth field indicates that a parameter set to which it belongs is for a CHO or a CPC.

In one embodiment, the phrase of the fourth field indicating a configuration status of a parameter set to which it belongs includes: the fourth field indicates that a parameter set to which it belongs is configured by the first entity, or by the second entity, or by the first entity and the second entity at the same time.

In one embodiment, the phrase of the fourth field indicating a configuration status of a parameter set to which it belongs includes: the fourth field indicates that a parameter set to which it belongs originates from a first entity or from a second entity.

In one subembodiment of the above embodiment, the fourth field is set to a first entity to indicate that a parameter set to which it belongs originates from the first entity.

In one subembodiment of the above embodiment, the fourth field is set to a second entity to indicate that a parameter set to which it belongs originates from the second entity.

In one subembodiment of the above embodiment, when a configuration is generated in an entity, the configuration originates from the entity.

In one subembodiment of the above embodiment, when a configuration is transmitted through an entity, the configuration originates from the one entity.

In one embodiment, the phrase of the fourth field indicating a configuration status of a parameter set to which it belongs includes: the fourth field implicitly indicates a configuration status of a parameter set to which it belongs.

In one subembodiment of the above embodiment, the fourth field existing indicates that a parameter set to which it belongs originates from the first entity.

In one subembodiment of the above embodiment, the fourth field not existing indicates that a parameter set to which it belongs originates from the second entity.

In one subembodiment of the above embodiment, the fourth field being configured indicates that a parameter set to which it belongs originates from the first entity.

In one subembodiment of the above embodiment, the fourth field not being configured indicates that a parameter set to which it belongs originates from the second entity.

In one embodiment, the phrase of originating from a first entity in the present disclosure includes: being configured by the first entity.

In one embodiment, the phrase of originating from a first entity in the present disclosure includes: being received through the first entity.

In one embodiment, the phrase of originating from a first entity in the present disclosure includes: being related to the first entity In one embodiment, the phrase of originating from a first entity in the present disclosure includes: being associated with the first entity.

In one embodiment, the phrase of originating from a first entity in the present disclosure includes: being transmitted through the first entity.

In one embodiment, the phrase of originating from a first entity in the present disclosure includes: being initiated by the first entity.

In one embodiment, the phrase of originating from a first entity in the present disclosure includes: being from the first entity.

In one embodiment, the phrase of originating from a first entity in the present disclosure includes: being generated by the first entity.

In one embodiment, the phrase of originating from a second entity in the present disclosure includes: being configured by the second entity.

In one embodiment, the phrase of originating from a second entity in the present disclosure includes: being received through the second entity.

In one embodiment, the phrase of originating from a second entity in the present disclosure includes: being related to the second entity In one embodiment, the phrase of originating from a second entity in the present disclosure includes: being associated with the second entity.

In one embodiment, the phrase of originating from a second entity in the present disclosure includes: being transmitted through the second entity.

In one embodiment, the phrase of originating from a second entity in the present disclosure includes: being initiated by the second entity.

In one embodiment, the phrase of originating from a second entity in the present disclosure includes: being from the second entity.

In one embodiment, the phrase of originating from a second entity in the present disclosure includes: being generated by the second entity.

In one embodiment, the first entity in the present disclosure comprises an MN, and the second entity comprises an SN.

In one embodiment, the first entity in the present disclosure comprises an SN, and the second entity comprises an MN.

In one embodiment, the first entity in the present disclosure comprises a PCell, and the second entity comprises a PSCell.

In one embodiment, the first entity in the present disclosure comprises a PSCell, and the second entity comprises a PCell.

In one embodiment, the first entity in the present disclosure is an NR entity, and the second entity is an LTE entity.

In one embodiment, the first entity in the present disclosure is an LTE entity, and the second entity is an NR entity.

In one embodiment, the first entity and the second entity in the present disclosure are respectively an NR entity.

In one embodiment, the first entity and the second entity in the present disclosure are respectively an LTE entity.

In one embodiment, the first entity in the present disclosure is the same as the second entity.

In one embodiment, the first entity in the present disclosure is different from the second entity.

In one embodiment, the first entity and the second entity in the present disclosure respectively comprise a communication node.

In one embodiment, the first entity and the second entity in the present disclosure respectively comprise a gNB.

In one embodiment, the first entity and the second entity in the present disclosure respectively comprise an eNB.

In one embodiment, the first entity and the second entity in the present disclosure respectively comprise a gNB and an eNB.

In one embodiment, the first entity and the second entity in the present disclosure respectively comprise an eNB and a gNB.

In one embodiment, the first entity and the second entity in the present disclosure respectively comprise a Signaling Radio Bear (SRB).

In one subembodiment of the embodiment, the SRB comprises an SRB1, the SRB1 is used for an MN, or the SRB1 is used for a PCell, or the SRB1 is used for an MCG.

In one subembodiment of the embodiment, the SRB comprises an SRB2, the SRB2 is used for an MN, or the SRB2 is used for a PCell, or the SRB2 is used for an MCG.

In one subembodiment of the embodiment, the SRB comprises an SRB3, the SRB3 is used for an SN, or the SRB3 is used for a PSCell, or the SRB3 is used for an SCG.

In one embodiment, the first entity in the present disclosure comprises an SRB1, and the second entity comprises an SRB3.

In one embodiment, the first entity in the present disclosure comprises an SRB3, and the second entity comprises an SRB1.

In one embodiment, the first entity and the second entity in the present disclosure respectively comprise an RLC entity.

In one embodiment, a value of the fourth field comprises a first status and a second status.

In one embodiment, a value of the fourth field comprises at least one of a first status or a second status.

In one embodiment, the fourth field in the present disclosure is set to a first status to indicate that a parameter set to which a fourth field belongs is for a CPA.

In one embodiment, the fourth field in the present disclosure is set to a first status to indicate that a parameter set to which a fourth field belongs is for a CPC.

In one embodiment, the fourth field in the present disclosure is set to a first status to indicate that a parameter set to which a fourth field belongs is for a CHO.

In one embodiment, the fourth field in the present disclosure is set to a first status to indicate that a parameter set to which a fourth field belongs is for a CPAC.

In one embodiment, the fourth field in the present disclosure is set to a first status to indicate that a parameter set to which a fourth field belongs is for an intra-SN CPC.

In one embodiment, the fourth field in the present disclosure is set to a first status to indicate that a parameter set to which a fourth field belongs is for an inter-SN CPC.

In one embodiment, the fourth field in the present disclosure is set to a first status to indicate that a parameter set to which a fourth field belongs originates from a first entity.

In one embodiment, the fourth field in the present disclosure is set to a first status to indicate that a parameter set to which a fourth field belongs originates from a second entity.

In one embodiment, the fourth field in the present disclosure is set to a second status to indicate that a parameter set to which a fourth field belongs is for a CPA.

In one embodiment, the fourth field in the present disclosure is set to a second status to indicate that a parameter set to which a fourth field belongs is for a CPC.

In one embodiment, the fourth field in the present disclosure is set to a second status to indicate that a parameter set to which a fourth field belongs is for a CHO.

In one embodiment, the fourth field in the present disclosure is set to a second status to indicate that a parameter set to which a fourth field belongs is for a CPAC.

In one embodiment, the fourth field in the present disclosure is set to a second status to indicate that a parameter set to which a fourth field belongs is for an intra-SN CPC.

In one embodiment, the fourth field in the present disclosure is set to a second status to indicate that a parameter set to which a fourth field belongs is for an inter-SN CPC.

In one embodiment, the fourth field in the present disclosure is set to a second status to indicate that a parameter set to which a fourth field belongs originates from a first entity.

In one embodiment, the fourth field in the present disclosure is set to a second status to indicate that a parameter set to which a fourth field belongs originates from a second entity.

In one embodiment, the phrase of the fourth field indicating a configuration status of a parameter set to which it belongs includes: the fourth field explicitly indicates a configuration status of a parameter set to which it belongs.

In one subembodiment of the above embodiment, the fourth field is set to true to indicate that a parameter set to which it belongs is for an intra-SN CPC.

In one subembodiment of the above embodiment, the fourth field is set to false to indicate that a parameter set to which it belongs is for an inter-SN CPC.

In one embodiment, the fourth field comprises 1 bit.

In one subembodiment of the above embodiment, the fourth field is set to 1 to indicate that the fourth field is set to a first status.

In one subembodiment of the above embodiment, the fourth field is set to 0 to indicate that the fourth field is set to a first status.

In one subembodiment of the above embodiment, the fourth field is set to 1 to indicate that the fourth field is set to a second status.

In one subembodiment of the above embodiment, the fourth field is set to 0 to indicate that the fourth field is set to a second status.

In one subembodiment of the above embodiment, the fourth field is set to 1 to indicate that the fourth field is set to a first status, and the fourth field is set to 0 to indicate that the fourth field is set to a second status.

In one subembodiment of the above embodiment, the fourth field is set to 0 to indicate that the fourth field is set to a first status, and the fourth field is set to 1 to indicate that the fourth field is set to a second status.

In one embodiment, the fourth field comprises an enumeration variable.

In one subembodiment of the above embodiment, the fourth field is set to 1 to indicate that the fourth field is set to a first status.

In one subembodiment of the above embodiment, the fourth field is set to 0 to indicate that the fourth field is set to a first status.

In one subembodiment of the above embodiment, the fourth field is set to 1 to indicate that the fourth field is set to a second status.

In one subembodiment of the above embodiment, the fourth field is set to 0 to indicate that the fourth field is set to a second status.

In one subembodiment of the above embodiment, the fourth field is set to 1 to indicate that the fourth field is set to a first status, and the fourth field is set to 0 to indicate that the fourth field is set to a second status.

In one subembodiment of the above embodiment, the fourth field is set to 0 to indicate that the fourth field is set to a first status, and the fourth field is set to 1 to indicate that the fourth field is set to a second status.

In one embodiment, the fourth field comprises a Boolean Variable.

In one subembodiment of the above embodiment, the fourth field is set to true to indicate that the fourth field is set to a first status.

In one subembodiment of the above embodiment, the fourth field is set to true to indicate that the fourth field is set to a first status.

In one subembodiment of the above embodiment, the fourth field is set to false to indicate that the fourth field is set to a second status.

In one subembodiment of the above embodiment, the fourth field is set to false to indicate that the fourth field is set to a second status.

In one subembodiment of the above embodiment, the fourth field is set to true to indicate that the fourth field is set to a first status, and the fourth field is set to false to indicate that the fourth field is set to a second status.

In one subembodiment of the above embodiment, the fourth field is set to false to indicate that the fourth field is set to a first status, and the fourth field is set to true to indicate that the fourth field is set to a second status.

In one example, the first flag is set to indicate that the first signaling originates from a first entity.

In one example, the first flag is set to indicate that the first signaling originates from a second entity.

In one example, the first flag is not set to indicate that the first signaling originates from a first entity.

In one example, the first flag is not set to indicate that the first signaling originates from a second entity.

In one example, the first flag is set to indicate that the first signaling originates from a first entity, and the first flag is not set to indicate that the first signaling originates from a second entity.

In one example, the first flag is set to indicate that the first configuration originates from a first entity.

In one example, the first flag is set to indicate that the first configuration originates from a second entity.

In one example, the first flag is not set to indicate that the first configuration originates from a first entity.

In one example, the first flag is not set to indicate that the first configuration originates from a second entity.

In one example, the first flag is set to indicate that the first configuration originates from a first entity, and the first flag is not set to indicate that the first configuration originates from a second entity.

In one embodiment, when the first flag is set and a fourth field in the first target parameter set is set to a first status, the first target parameter set is reserved.

In one embodiment, when the first flag is set and a fourth field in the first target parameter set is set to a second status, the first target parameter set is updated to the first parameter set.

In one embodiment, when the first flag is set and a fourth field in the first target parameter set is set to a second status, the first configuration is dropped.

In one embodiment, when the first flag is set and if there exists a first target parameter set and a fourth field in the first target parameter set is set to a second status, the first configuration is dropped.

In one embodiment, when the first flag is not set, the first configuration is dropped.

In one embodiment, the phrase of any parameter set in the first storage space comprising a fourth field includes: the fourth field is one field in any parameter set.

In one embodiment, the phrase of any parameter set in the first storage space comprising a fourth field includes: the fourth field is one field in the first storage space.

In one embodiment, any parameter set in the first storage space comprises the first field, the second field, the third field and the fourth field.

In one embodiment, the first parameter set comprises the fourth field.

In one embodiment, the first parameter set comprises the first field, the second field, the third field and the fourth field.

In one embodiment, the first target parameter set comprises the fourth field.

In one embodiment, the first target parameter set comprises the first field, the second field, the third field and the fourth field.

In one embodiment, the first structure type comprises SEQUENCE.

In one embodiment, the first structure type comprises CHOICE.

In one embodiment, the second structure type comprises SEQUENCE.

In one embodiment, the second structure type comprises CHOICE.

Embodiment 9

Figure 9:
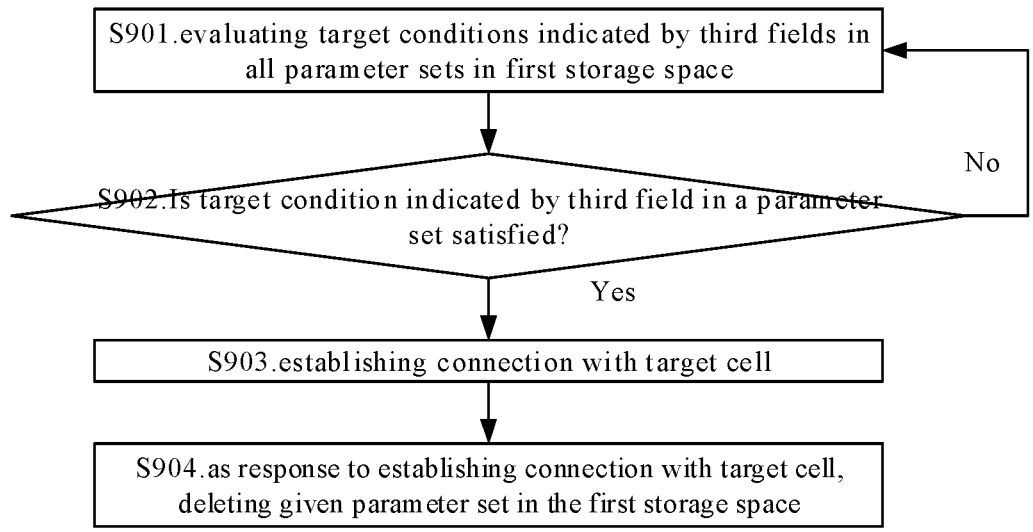
FIG. 9 illustrates a flowchart of a first node executing a conditional reconfiguration according to another embodiment of the present disclosure.

Embodiment 9 illustrates a flowchart of a first node executing a conditional configuration according to another embodiment of the present disclosure, as shown in FIG. 9. It is particularly underlined that the order illustrated in the embodiment does not put constraints over sequences of signal transmissions and implementations.

In embodiment 9, the first node in step S901 evaluates target conditions indicated by third fields in all parameter sets in the first storage space; in step S902, judges whether a target condition indicated by a third field in any parameter set in the first storage space is satisfied, if yes, executes step S903, otherwise, continues to execute step S901; in step S903, when a target condition indicated by a third field in a parameter set in the first storage space is satisfied, applies a target configuration indicated by a second field in the parameter set; and in step S904, establishes a connection with a target cell; in step S905, as a response to establishing a connection with a target cell, clears a given parameter set in the first storage space, and a status indicated by a fourth field in any parameter set in the given parameter set is the same as a status indicated by a fourth field in the parameter set.

In one embodiment, the target condition and the target configuration are associated with the target cell.

In one subembodiment of the above embodiment, the phrase of the target condition and the target configuration being associated with the target cell includes: the target condition is evaluated for the target cell.

In one subembodiment of the above embodiment, the phrase of the target condition and the target configuration being associated with the target cell includes: the target condition comprises an ID of the target cell.

In one subembodiment of the above embodiment, the phrase of the target condition and the target configuration being associated with the target cell includes: the target configuration is used for the target cell.

In one subembodiment of the above embodiment, the phrase of the target condition and the target configuration being associated with the target cell includes: the target configuration is for the target cell.

In one subembodiment of the above embodiment, the phrase of the target condition and the target configuration being associated with the target cell includes: the target configuration comprises an ID of the target cell.

In one subembodiment of the above embodiment, the phrase of the target condition and the target configuration being associated with the target cell includes: the parameter set comprises an ID of the target cell.

In one subsidiary embodiment of the above subembodiment, the phrase of the parameter set indicating the target cell includes: the parameter set comprises a fifth field, and the fifth field comprises an ID of the target cell.

In one subsidiary embodiment of the above subembodiment, the phrase of the parameter set indicating the target cell includes: the first field of the parameter set comprises an ID of the target cell.

In one subsidiary embodiment of the above subembodiment, the phrase of the parameter set indicating the target cell includes: the second field of the parameter set comprises an ID of the target cell.

In one subsidiary embodiment of the above subembodiment, the phrase of the parameter set indicating the target cell includes: the third field of the parameter set comprises an ID of the target cell.

In one subsidiary embodiment of the above subembodiment, the phrase of the parameter set indicating the target cell includes: the fourth field of the parameter set comprises an ID of the target cell.

In one subsidiary embodiment of the above subembodiment, an ID of the target cell is a non-negative integer not greater than 1007.

In one subsidiary embodiment of the above subembodiment, an ID of the target cell is a positive integer not greater than 31.

In one subsidiary embodiment of the above subembodiment, an ID of the target cell comprises a cell identity.

In one subsidiary embodiment of the above subembodiment, an ID of the target cell comprises a Physical Cell Identity (PCI).

In one subsidiary embodiment of the above subembodiment, an ID of the target cell comprises a CellIdentity.

In one subsidiary embodiment of the above subembodiment, an ID of the target cell comprises a Cell Global Identifier (CGI).

In one subsidiary embodiment of the above subembodiment, an ID of the target cell comprises a E-UTRAN Cell Global Identifier (ECGI).

In one subsidiary embodiment of the above subembodiment, an ID of the target cell comprises a beam identifier.

In one subsidiary embodiment of the above subembodiment, an ID of the target cell comprises a Bandwidth Part (BWP) identifier.

In one subsidiary embodiment of the above subembodiment, an ID of the target cell comprises a Transmission Reception Point (TRP) identifier.

In one subsidiary embodiment of the above subembodiment, an ID of the target cell comprises a CSI-RS-Index.

In one subsidiary embodiment of the above subembodiment, an ID of the target cell comprises a physCellId.

In one subsidiary embodiment of the above subembodiment, an ID of the target cell comprises a DRB-Identity.

In one subsidiary embodiment of the above subembodiment, an ID of the target cell comprises a PLMN-Identity.

In one subsidiary embodiment of the above subembodiment, an ID of the target cell comprises a TrackingArea-Code.

In one subsidiary embodiment of the above subembodiment, an ID of the target cell comprises a NPN-Identity.

In one subsidiary embodiment of the above subembodiment, an ID of the target cell comprises a physicalCellId.

In one subsidiary embodiment of the above subembodiment, an ID of the target cell comprises a eutra-PhysCellId.

In one subsidiary embodiment of the above subembodiment, an ID of the target cell comprises a PhysCellIdCDMA2000.

In one subsidiary embodiment of the above subembodiment, an ID of the target cell comprises a PhysCellIdG-ERAN.

In one subsidiary embodiment of the above subembodiment, an ID of the target cell comprises a PhysCellIdNR.

In one subsidiary embodiment of the above subembodiment, an ID of the target cell comprises a drb-Id.

In one subsidiary embodiment of the above subembodiment, an ID of the target cell comprises a CellIndexList.

In one subsidiary embodiment of the above subembodiment, an ID of the target cell comprises an sCellIndex.

In one subsidiary embodiment of the above subembodiment, an ID of the target cell comprises a cellIdentification.

In one subsidiary embodiment of the above subembodiment, an ID of the target cell comprises a dl-CarrierFreq.

In one embodiment, the phrase of establishing a connection with the target cell includes: obtaining an uplink synchronization with the target cell.

In one embodiment, the phrase of establishing a connection with the target cell includes: obtaining a downlink synchronization with the target cell.

In one embodiment, the phrase of establishing a connection with the target cell includes: executing random access for a target cell.

In one subembodiment of the embodiment, the phrase of executing a random access for a target cell includes: initiating a random access procedure for the target cell.

In one subembodiment of the embodiment, the phrase of executing a random access for a target cell includes: executing an initial access for the target cell.

In one subembodiment of the embodiment, the action of executing a random access for a target cell includes: executing a 4-step RACH for the target cell.

In one subembodiment of the embodiment, the action of executing a random access for a target cell includes: executing a 2-step RACH for the target cell.

In one subembodiment of the embodiment, the action of executing a random access for a target cell includes: transmitting Message 1 (Msg1).

In one subsidiary embodiment of the subembodiment, the Msg1 comprises a preamble sequence.

In one subsidiary embodiment of the subembodiment, the Msg1 comprises a Physical Random Access Channel (PRACH).

In one subembodiment of the embodiment, the action of executing a random access for a target cell includes: receiving Msg2.

In one subsidiary embodiment of the subembodiment, the Msg2 comprises a Random Access Response (RAR).

In one subsidiary embodiment of the subembodiment, the Msg2 comprises a Cell-Radio Network Temporary Identity (C-RNTI).

In one subembodiment of the embodiment, the action of executing a random access for a target cell includes: transmitting Msg3.

In one subsidiary embodiment of the subembodiment, the Msg3 comprises an uplink scheduling.

In one subsidiary embodiment of the subembodiment, the Msg3 comprises an RRC message.

In one subembodiment of the embodiment, the action of executing a random access for a target cell includes: receiving Msg4.

In one subsidiary embodiment of the subembodiment, the Msg4 comprises a UE Contention Resolution Identity.

In one subsidiary embodiment of the subembodiment, the Msg1 comprises a C-RNTI.

In one subembodiment of the embodiment, the action of executing a random access for a target cell includes: transmitting MsgA.

In one subsidiary embodiment of the embodiment, the Msg A comprises the Msg 1.

In one subsidiary embodiment of the above embodiment, the Msg A comprises the Msg 3.

In one subembodiment of the embodiment, the action of executing a random access for a target cell includes: receiving MsgB.

In one subsidiary embodiment of the embodiment, the Msg B comprises the Msg 2.

In one subsidiary embodiment of the embodiment, the Msg B comprises the Msg 4.

In one embodiment, in step S904 a fourth signaling is transmitted, and the fourth signaling indicates that a connection establishment with the target cell is completed.

In one subembodiment of the embodiment, the fourth signaling comprises an RRCconnectionreconfigurationcomplete message.

In one subembodiment of the embodiment, the fourth signaling comprises all or part of an RRC signaling.

In one subembodiment of the embodiment, the fourth signaling comprises all or partial IEs in an RRC message.

In one subembodiment of the embodiment, the fourth signaling comprises all or partial fields in an IE in an RRC Message.

In one subembodiment of the embodiment, as a response to receiving the fourth signaling, the second signaling is transmitted.

In one subembodiment of the embodiment, the fourth signaling and the third signaling are transmitted in a same RRC signaling.

In one embodiment, the phrase of clearing includes removing.

In one embodiment, the phrase of clearing includes deleting.

In one embodiment, the phrase of clearing includes not continuing to store.

In one embodiment, the phrase of a target condition indicated by a third field includes: the first field comprises the target condition.

In one embodiment, the phrase of a target configuration indicated by a second field includes: the second field comprises the target configuration.

In one embodiment, the phrase of a status indicated by the fourth field includes: a status in which the fourth field is configured.

In one embodiment, the phrase of a status indicated by the fourth field includes: a status indicated by a configured value of the fourth field.

Embodiment 10

Figure 10:
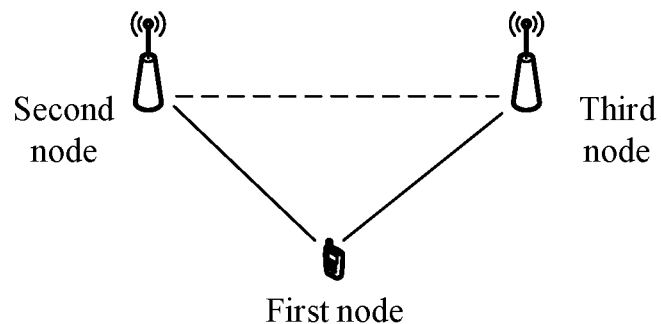
FIG. 10 illustrates a schematic diagram of a first node being connected with a second node and a third node at the same time according to one embodiment of the present disclosure.

Embodiment 10 illustrates a schematic diagram of a first node being connected with a second node and a third node at the same time according to one embodiment of the present disclosure. In FIG. 10, the first node is a UE, and the second node and the third node are respectively two base stations. Two solid lines respectively represent a link between the first node and the second node as well as a link between the first node and the third node; and the dotted line represents a link between the second node and the third node.

In Embodiment 10, the first node connects with the second node and the third node at the same time.

In one embodiment, the second node comprises the second-type node in the present disclosure.

In one embodiment, the third node comprises the second-type node in the present disclosure.

In one embodiment, the second node and the third node are connected via an Xn interface.

In one embodiment, the second node and the third node are connected via an Xn-C interface.

In one embodiment, the second node and the third node are connected via an X2-C interface.

In one embodiment, a link between the second node and the third node is a non-ideal backhaul.

In one embodiment, a link between the second-type node and the third node is an ideal backhaul.

In one embodiment, the first node and the third node are connected via a Uu interface.

In one embodiment, the first node and the second node are connected via a Uu interface.

In one embodiment, the first node is a device supporting dual connectivity.

In one embodiment, the first node supports Multi-Radio Dual Connectivity (MR-DC).

In one embodiment, the first node supports NR-NR Dual Connectivity (NR DC).

In one embodiment, the first node supports Intra-E-UTRA DC.

In one embodiment, the first node supports NR-E-UTRA Dual Connectivity (NE-DC).

In one embodiment, the first node supports NG-RAN E-UTRA-NR Dual Connectivity (NGEN-DC).

In one embodiment, the first node supports E-UTRA-NR Dual Connectivity (EN DC).

In one embodiment, a signaling bearer between the first node and the second node comprises an SRB1.

In one embodiment, a signaling bearer between the first node and the second node comprises an SRB2.

In one embodiment, a signaling bearer between the first node and the second node comprises an SRB3.

In one embodiment, a signaling bearer between the first node and the third node comprises an SRB1.

In one embodiment, a signaling bearer between the first node and the third node comprises an SRB2.

In one embodiment, a signaling bearer between the first node and the third node comprises an SRB3.

In one embodiment, the second node comprises an MN, and the third node comprises an SN.

In one embodiment, the second node comprises a Master eNodeB (MeNB), and the third node comprises a Secondary eNodeB (SgNB).

In one embodiment, the second node comprises a Centralized Unit (CU), and the third node comprises a DU.

In one embodiment, the second node comprises a node in an MCG, and the third node comprises a node in an SCG.

In one embodiment, the second node comprises an SN, and the third node comprises an MN.

In one embodiment, the second node comprises an SgNB, and the third node comprises an MeNB.

In one embodiment, the second node comprises a Distributed Unit (DU), and the third node comprises a CU.

In one embodiment, the second node comprises a node in an SCG, and the third node comprises a node in an MCG.

In one embodiment, the second node comprises a maintenance base station of a PCell, and the third node comprises a maintenance base station of a PSCell.

In one embodiment, the second node comprises a maintenance base station of a PSCell, and the third node comprises a maintenance base station of a PCell.

In one embodiment, the second node corresponds to the first entity, and the third node corresponds to the second entity.

In one embodiment, the second node corresponds to the second entity, and the third node corresponds to the first entity.

Embodiment 11

Figure 11:
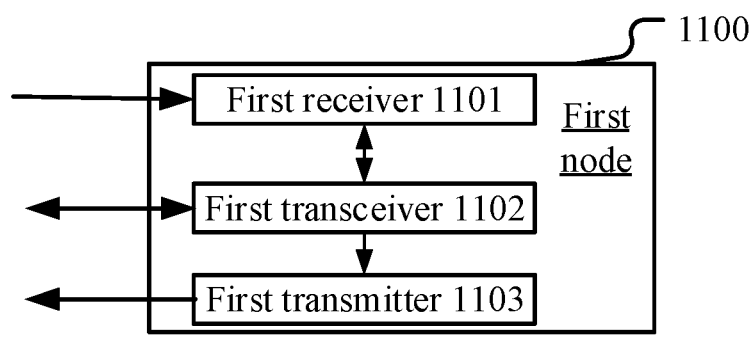
FIG. 11 illustrates a structure block diagram of a processing device in a first node according to one embodiment of the present disclosure.

Embodiment 11 illustrates a structure block diagram of a processing device in a first node according to one embodiment of the present disclosure, as shown in FIG. 11. In FIG. 11, a processing device 1300 in a first node comprises a first receiver 1101, a first transceiver 1102 and a first transmitter 1103.

The first receiver 1101 receives a first signaling, the first signaling comprising a first flag, and processes a first storage space according to the first flag;

In embodiment 11, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target configuration, and the third field comprises a target condition.

In one embodiment, the first signaling comprises all or part of an RRCReconfiguration message.

In one embodiment, the first signaling comprises all or part of an RRCConnectionReconfiguration message.

In one embodiment, the first signaling comprises a Radio Resource Control (RRC) message.

The first transmitter 1103 transmits a third signaling.

In one embodiment, as a response to the behavior of deleting a parameter set in the first storage space, a third signaling is transmitted.

In one embodiment, the third signaling indicates that a parameter set in a first storage space is deleted.

In one embodiment, the third signaling comprises an RRCconnectionreconfigurationcomplete message.

In one embodiment, the third signaling comprises all or part of an RRC signaling.

In one embodiment, the third signaling comprises all or partial IEs in an RRC message.

In one embodiment, the third signaling comprises all or partial fields in an IE in an RRC message.

In one embodiment, the third signaling indicates an ID of the first node.

In one embodiment, a receiving node of the third signaling releases a conditional reconfiguration performed on the first node.

In one embodiment, the first receiver 1101 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises the antenna 452, the receiver 454, the multi-antenna receiving processor 458 and the receiving processor 456 in FIG. 4 of the present disclosure.

In one embodiment, the first receiver 1101 comprises the antenna 452, the receiver 454 and the receiving processor 456 in FIG. 4 of the present disclosure.

In one embodiment, the first transceiver 1102 comprises the antenna 452, the receiver 454, the multi-antenna receiving processor 458, the receiving processor 456, the controller/processor 459, the memory 460, the data source 467, the transmitter 454, the multi-antenna transmitting processor 457 and the transmitting processor 468 in FIG. 4 of the present disclosure.

In one embodiment, the first transceiver 1102 comprises the antenna 452, the receiver 454, the multi-antenna receiving processor 458, the receiving processor 456, the transmitter 454, the multi-antenna transmitting processor 457 and the transmitting processor 468 in FIG. 4 of the present disclosure.

In one embodiment, the first transceiver 1102 comprises the antenna 452, the receiver 454, the receiving processor 456, the transmitter 454 and the transmitting processor 468 in FIG. 4 of the present disclosure.

In one embodiment, the first transmitter 1103 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1103 comprises the antenna 452, the transmitter 454, the multi-antenna transmitting processor 457 and the transmitting processor 468 in FIG. 4 of the present disclosure.

In one embodiment, the first transmitter 1103 comprises the antenna 452, the transmitter 454 and the transmitting processor 468 in FIG. 4 of the present disclosure.

Embodiment 12

Figure 12:
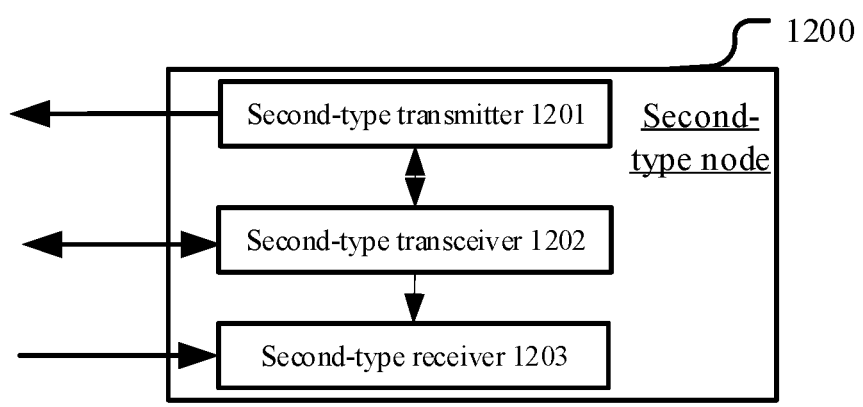
FIG. 12 illustrates a structure block diagram of a processing device in a second-type node according to one embodiment of the present disclosure.

Embodiment 12 illustrates a structure block diagram of a processing device in a second-type node according to one embodiment of the present disclosure, as shown in FIG. 12. In FIG. 12, a processing device 1200 in the second-type node comprises a second-type transmitter 1201, a second-type transceiver 1202 and a second-type receiver 1203.

The second-type transmitter 1201 transmits a first signaling, the first signaling comprising a first flag, and a first storage is processed according to the first flag;

In embodiment 12, the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition.

The second-type transceiver 1202 transmits a second signaling.

In embodiment 12, the second signaling indicates that a parameter set in the first storage space is deleted.

In one embodiment, as a response to transmitting the first signaling, the second signaling is transmitted.

In one embodiment, as a response to the first flag being set, the second signaling is transmitted.

In one embodiment, the second-type transmitter 1201 comprises the antenna 420, the transmitter 418, the multi-antenna transmitting processor 471, the transmitting processor 416, the controller/processor 475 and the memory 476 in FIG. 4 of the present disclosure.

In one embodiment, the second-type transmitter 1201 comprises the antenna 420, the transmitter 418, the multi-antenna transmitting processor 471 and the transmitting processor 416 in FIG. 4 of the present disclosure.

In one embodiment, the second-type transmitter 1201 comprises the antenna 420, the transmitter 418 and the transmitting processor 416 in FIG. 4 of the present disclosure.

In one embodiment, the second-type transceiver 1202 comprises the antenna 420, the transmitter 418, the multi-antenna transmitting processor 471, the transmitting processor 416, the controller/processor 475, the memory 476, the receiver 418, the multi-antenna receiving processor 472, the receiving processor 470 and the memory 476 in FIG. 4 of the present disclosure.

In one embodiment, the second-type transceiver 1202 comprises the antenna 420, the transmitter 418, the multi-antenna transmitting processor 471, the transmitting processor 416, the receiver 418, the multi-antenna receiving processor 472 and the receiving processor 470 in FIG. 4 of the present disclosure.

In one embodiment, the second-type transceiver 1202 comprises the antenna 420, the transmitter 418, the transmitting processor 416, the receiver 418 and the receiving processor 470 in FIG. 4 of the present disclosure.

In one embodiment, the second-type receiver 1203 comprises the antenna 420, the receiver 418, the multi-antenna receiving processor 472, the receiving processor 470, the controller/processor 475 and the memory 476 in FIG. 4 of the present disclosure.

In one embodiment, the second-type receiver 1203 comprises the antenna 420, the receiver 418, the multi-antenna receiving processor 472 and the receiving processor 470 in FIG. 4 of the present disclosure.

In one embodiment, the second-type receiver 1203 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
    a first receiver, receiving a first signaling, the first signaling comprising a first flag, and processing a first storage space according to the first flag;
    the first receiver, when the first flag is set, updating a first target parameter set to a first parameter set; and when the first flag is not set, reserving the first target parameter set;
    wherein the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition; the first target parameter set is a parameter set in the first storage space; a first field in the first target parameter set comprises a target index, and the target index is the same as the first index.

2. The first node according to claim 1, comprising:
    the first receiver, when the first flag is set, deleting a parameter set in the first storage space, and adding a first parameter set in the first storage space according to the first configuration;
    wherein the first field, the second field and the third field in the first parameter set respectively comprise the first index, the first RRC configuration and the first condition.

3. The first node according to claim 1, wherein any parameter set in the first storage space comprises a fourth field, and the fourth field indicates a configuration status of a parameter set to which it belongs.

4. The first node according to claim 3, comprising:
    the first receiver, when the first flag is set and the fourth field in the first target parameter set is set to a first status, reserving the first target parameter set.

5. The first node according to claim 3, comprising:
    the first receiver, when the first flag is set and the fourth field in the first target parameter set is set to a second status, updating the first target parameter set to a first parameter set.

6. The first node according to claim 3, comprising:
    the first receiver, when the target condition indicated by the third field in a parameter set in the first storage space is satisfied, applying a target configuration indicated by the second field in the parameter set; as a response to establishing a connection with a target cell, clearing a given parameter set in the first storage space, and a status indicated by the fourth field in the given parameter set being the same as a status indicated by the fourth field in the parameter set;
    wherein the target condition and the target configuration are associated with the target cell.

7. The first node according to claim 1, comprising:
    the first transmitter, transmitting a third signaling, the third signaling indicating that a parameter set in the first storage space is deleted.

8. A second-type node for wireless communications, comprising:
    a second-type transmitter, transmitting a first signaling, the first signaling comprising a first flag, a first storage being processed according to the first flag; when the first flag is set, a first target parameter set to a first parameter set is updated; and when the first flag is not set, the first target parameter set is reserved;
    wherein the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition; the first target parameter set is a parameter set in the first storage space; a first field in the first target parameter set comprises a target index, and the target index is the same as the first index.

9. The second-type node according to claim 8, comprising:
    a second-type receiver, receiving a third signaling, the third signaling indicating that a parameter set in the first storage space is deleted.

10. A method in a first node for wireless communications, comprising:
    receiving a first signaling, the first signaling comprising a first flag, processing a first storage space according to the first flag;
    when the first flag is set, updating a first target parameter set to a first parameter set; and when the first flag is not set, reserving the first target parameter set;
    wherein the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition; the first target parameter set is a parameter set in the first storage space; a first field in the first target parameter set comprises a target index, and the target index is the same as the first index.

11. The method in a first node for wireless communications according to claim 10, comprising:
    the first receiver, when the first flag is set, deleting a parameter set in the first storage space, and adding a first parameter set in the first storage space according to the first configuration;
    wherein the first field, the second field and the third field in the first parameter set respectively comprise the first index, the first RRC configuration and the first condition.

12. The method in a first node for wireless communications according to claim 10, wherein any parameter set in the first storage space comprises a fourth field, and the fourth field indicates a configuration status of a parameter set to which it belongs.

13. The method in a first node for wireless communications according to claim 12, comprising:

the first receiver, when the first flag is set and the fourth field in the first target parameter set is set to a first status, reserving the first target parameter set.

14. The method in a first node for wireless communications according to claim 12, comprising:
the first receiver, when the first flag is set and the fourth field in the first target parameter set is set to a second status, updating the first target parameter set to a first parameter set.

15. The method in a first node for wireless communications according to claim 12, comprising:
the first receiver, when the target condition indicated by the third field in a parameter set in the first storage space is satisfied, applying a target configuration indicated by the second field in the parameter set; as a response to establishing a connection with a target cell, clearing a given parameter set in the first storage space, and a status indicated by the fourth field in the given parameter set being the same as a status indicated by the fourth field in the parameter set;
wherein the target condition and the target configuration are associated with the target cell.

16. The first node according to claim 10, comprising:
transmitting a third signaling, the third signaling indicating that a parameter set in the first storage space is deleted.

17. A method in a second-type node for wireless communications, comprising:
transmitting a first signaling, the first signaling comprising a first flag, a first storage being processed according to the first flag; when the first flag is set, a first target parameter set to a first parameter set is updated; and when the first flag is not set, the first target parameter set is reserved;
wherein the first signaling is an RRC signaling, and the first signaling is used for a conditional reconfiguration; the first signaling comprises a first configuration, the first configuration comprises at least one of a first index, or a first RRC configuration or a first condition; the first storage space stores at least one parameter set; any parameter set in the first storage space comprises a first field, a second field and a third field, the first field comprises a target index, the target index is a non-negative integer, the second field comprises a target RRC configuration, and the third field comprises a target condition; the first target parameter set is a parameter set in the first storage space; a first field in the first target parameter set comprises a target index, and the target index is the same as the first index.

18. The method in a second-type node for wireless communications according to claim 17, comprising:
receiving a third signaling, the third signaling indicating that a parameter set in the first storage space is deleted.

* * * * *